US012256195B2

(12) United States Patent
Zhu et al.

(10) Patent No.: US 12,256,195 B2
(45) Date of Patent: Mar. 18, 2025

(54) ACOUSTIC OUTPUT DEVICE

(71) Applicant: SHENZHEN SHOKZ CO., LTD., Guangdong (CN)

(72) Inventors: Guangyuan Zhu, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 161 days.

(21) Appl. No.: 18/169,846

(22) Filed: Feb. 15, 2023

(65) Prior Publication Data

US 2023/0328457 A1 Oct. 12, 2023

Related U.S. Application Data

(63) Continuation of application No. PCT/CN2022/085571, filed on Apr. 7, 2022.

(51) Int. Cl.
*H04R 17/10* (2006.01)

(52) U.S. Cl.
CPC .................................... *H04R 17/10* (2013.01)

(58) Field of Classification Search
CPC ... H04R 17/00; H04R 17/005; H04R 2217/01
See application file for complete search history.

(56) References Cited

U.S. PATENT DOCUMENTS

| | | | |
|---|---|---|---|
| 2004/0237676 A1 | 12/2004 | McKevitt et al. | |
| 2006/0008111 A1 | 1/2006 | Nagaoka | |
| 2008/0123876 A1 | 5/2008 | Sato et al. | |
| 2009/0285417 A1 | 11/2009 | Shin et al. | |
| 2020/0278719 A1 | 9/2020 | Starnes et al. | |
| 2022/0286772 A1 | 9/2022 | Zhou et al. | |

FOREIGN PATENT DOCUMENTS

| | | | |
|---|---|---|---|
| CN | 102300141 A | 12/2011 | |
| CN | 102833657 A | 12/2012 | |
| CN | 112637748 A | 4/2021 | |
| CN | 214544724 U | 10/2021 | |
| CN | 113746373 A | 12/2021 | |
| CN | 215268715 U | 12/2021 | |
| CN | 215991191 U | 3/2022 | |
| KR | 20060000894 A | 1/2006 | |
| WO | WO-2015103244 A2 * | 7/2015 | .......... B06B 1/0644 |

* cited by examiner

*Primary Examiner* — Ryan Robinson
(74) *Attorney, Agent, or Firm* — METIS IP LLC

(57) ABSTRACT

One or more embodiments of the present disclosure relates to an acoustic output device, including: a piezoelectric element configured to convert an electrical signal into a mechanical vibration; an elastic element; and a mass element connected to the piezoelectric element through the elastic element. The mass element may be configured to receive the mechanical vibration and generate an acoustic signal, and on a plane perpendicular to a vibration direction of the mass element, the elastic element may provide shear stresses with opposite curls.

20 Claims, 15 Drawing Sheets

ACOUSTIC OUTPUT DEVICE

CROSS-REFERENCE TO RELATED APPLICATION

This application is a continuation of International Application No. PCT/CN2022/085571, filed on Apr. 7, 2022, the contents of which are hereby incorporated by reference in its entirety.

TECHNICAL FIELD

The present disclosure relates to the field of acoustics, and in particular to an acoustic output device.

BACKGROUND

A piezoelectric speaker usually may generate vibrations based on the inverse piezoelectric effect of the piezoelectric ceramic material to radiate sound waves outward. Compared with a traditional electromagnetic speaker, the piezoelectric speaker has higher electromechanical conversion efficiency, lower energy consumption, smaller size, and higher integration. Under a trend of miniaturization and integration of devices, the piezoelectric speaker has an extremely broad prospect and future. However, compared with the traditional electromagnetic speaker, the piezoelectric speaker has a poorer low-frequency sound quality due to a poor low-frequency response of a piezoelectric acoustic device. Moreover, the piezoelectric speaker has a plurality of vibration modes in the audible domain, which makes it difficult for the piezoelectric speaker to obtain a relatively flat frequency response curve.

Therefore, it is desirable to provide an acoustic output device, thereby reducing the vibration modes in the audible domain and improving the low-frequency response of the acoustic output device.

SUMMARY

The embodiments of the present disclosure provide an acoustic output device, including a piezoelectric element configured to convert an electrical signal into a mechanical vibration, an elastic element, and a mass element connected to the piezoelectric element through the elastic element. The mass element may be configured to receive the mechanical vibration and generate an acoustic signal, and on a plane perpendicular to a vibration direction of the mass element, the elastic element may provide shear stresses with opposite curls.

In some embodiments, the elastic element may include a plurality of bar structures, and each bar structure may include one or more bending regions. The shear stress provided by each bending region may correspond to a curl.

In some embodiments, the plurality of bar structures may be located in a same plane perpendicular to the vibration direction of the mass element.

In some embodiments, a projection of the elastic element along the vibration direction of the mass element may have two symmetry axes perpendicular to each other.

In some embodiments, at least one of the plurality of bar structures may include a plurality of segments, and the segments may provide shear stresses with opposite curls.

In some embodiments, a count of the plurality of bar structures may be four.

In some embodiments, the acoustic output device may further include a second elastic element. The elastic element and the second elastic element may be connected to the mass element, respectively.

In some embodiments, the second elastic element and the elastic element may be located on a same plane, and the plane may be perpendicular to the vibration direction of the mass element.

In some embodiments, a central axis of the second elastic element may be parallel to a central axis of the elastic element.

In some embodiments, the second elastic element may be coaxial with the elastic element.

In some embodiments, a shape of the bar structure may include at least one of a broken line, an S-shape, a spline, an arc, or a straight line.

In some embodiments, the elastic element may include a first helical structure and a second helical structure, each of the first helical structure and the second helical structure is connected to the mass element and the piezoelectric element, and the first helical structure and the second helical structure may have a same axis and opposite helical directions.

In some embodiments, centers of the first helical structure and the second helical structure may be rigidly connected to each other, and the centers may be connected to the mass element.

In some embodiments, outer edges of the first helical structure and the second helical structure may be rigidly connected to each other, and the outer edges may be connected to the piezoelectric element.

In some embodiments, the piezoelectric element may include an annular structure, and an axis direction of the annular structure may be parallel to the vibration direction of the mass element.

In some embodiments, the annular structure may include a first annular structure and a second annular structure, and the second annular structure may be disposed inside the first annular structure.

In some embodiments, one end of the first annular structure along the axis direction may be fixed, and the other end of the first annular structure may be connected to the second annular structure through an outer ring elastic element of the elastic element; the mass element may be connected to the second annular structure through an inner ring elastic element of the elastic element, and a projection of a connection point between the mass element and the inner ring elastic element along the axis direction may be located within a projection of the second annular structure along the axis direction.

In some embodiments, one end of the second annular structure along the axis direction may be fixed, and the other end of the second annular structure may be connected to the first elastic element through the inner ring elastic element of the elastic element; at least a portion of the mass element may have an annular structure, the annular structure of the mass element may be connected to the first annular structure through an outer ring elastic element of the elastic element, and a projection of the annular structure of the mass element along the axis direction may be outside a projection of the first annular structure along the axis direction.

In some embodiments, at least a portion of the mass element may have an annular structure, and a projection of the annular structure of the mass element along the axis direction may be located between a projection of the first annular structure and a projection of the second annular structure along the axis direction; and the annular structure of the mass element may be connected to the second annular structure through an inner ring elastic element of the elastic element, and the annular structure of the mass element may be connected to the first annular structure through an outer ring elastic element of the elastic element.

In some embodiments, the first annular structure or the second annular structure may have a fixed end along the axis direction.

In some embodiments, the inner ring elastic element and the outer ring elastic element may provide shear stresses with opposite curls.

In some embodiments, a resonance of the elastic element and the mass element may generate a first resonance peak; and a resonance of the piezoelectric element may generate a second resonance peak.

In some embodiments, a frequency range of the first resonance peak may be in a range of 50 Hz-2000 Hz.

In some embodiments, the frequency range of the second resonance peak may be in a range of 1000 Hz-50000 Hz.

In some embodiments, the piezoelectric element may include: a piezoelectric sheet configured to generate the mechanical vibration based on the electrical signal, wherein an electrical direction of the piezoelectric sheet may be parallel to a direction of the mechanical vibration.

In some embodiments, the piezoelectric element may include: a piezoelectric sheet configured to generate a deformation based on the electrical signal, wherein an electrical direction of the piezoelectric sheet may be perpendicular to a direction of the deformation; and a substrate configured to generate the mechanical vibration based on the deformation, wherein a direction of the mechanical vibration may be parallel to the electrical direction of the piezoelectric sheet.

The embodiments of the present disclosure provide an acoustic output device, including a piezoelectric element configured to convert an electrical signal into a mechanical vibration; an elastic element including a plurality of bar structures, each bar structure including one or more bending regions; and a mass element connected to the piezoelectric element through the elastic element, the mass element being configured to receive the mechanical vibration and generate an acoustic signal, wherein the plurality of bar structures may be located within the same plane perpendicular to the vibration direction of the mass element, and a projection of the plurality of bar structures along a vibration direction of the mass element may have two symmetry axes perpendicular to each other.

In some embodiments, a count of the plurality of bar structures may be four.

In some embodiments, a shape of the bar structure may include at least one of a broken line, an S-shape, a spline, an arc, or a straight line.

In some embodiments, at least one of the plurality of bar structures may include a plurality of segments, and the plurality of segments may have opposite bending directions.

In some embodiments, the acoustic output device may further include a second elastic element, and the elastic element and the second elastic element may be connected to the mass element, respectively.

In some embodiments, the second elastic element and the elastic element may be located on a same plane, and the plane may be perpendicular to the vibration direction of the mass element.

In some embodiments, a central axis of the second elastic element may be parallel to a central axis of the elastic element.

In some embodiments, the second elastic element may be coaxial with the elastic element.

In some embodiments, a resonance of the elastic element and the mass element may generate a first resonance peak; and a resonance of the piezoelectric element may generate a second resonance peak.

In some embodiments, a frequency range of the first resonance peak may be in a range of 50 Hz-2000 Hz.

In some embodiments, the frequency range of the second resonance peak may be in a range of 1000 Hz-50000 Hz.

The embodiments of the present disclosure provide an acoustic output device, including: a piezoelectric element configured to convert an electrical signal into a mechanical vibration; an elastic element; and a mass element connected to the piezoelectric element through the elastic element, the mass element being configured to receive the mechanical vibration to generate an acoustic signal. The elastic element may include a first helical structure and a second helical structure, and each of the first helical structure and the second helical structure may be connected to the mass element and the piezoelectric element; the first helical structure and the second helical structure may have a same axis and opposite helical directions.

In some embodiments, centers of the first helical structure and the second helical structure may be rigidly connected to each other, and the centers may be connected to the mass element.

In some embodiments, outer edges of the first helical structure and the second helical structure may be rigidly connected to each other, and the outer edges may be connected to the piezoelectric element.

The embodiments of the present disclosure provide an acoustic output device, including: a piezoelectric element configured to convert an electrical signal into a mechanical vibration; an upper elastic element and a lower layer elastic element, each of the upper elastic element and the lower elastic element may include a plurality of bar structures, and each bar structure may include one or more bending regions; and a mass element, each of the upper elastic element and the lower layer elastic element may be connected to the mass element and the piezoelectric element, and the mass element may be configured to receive the mechanical vibration and generate an acoustic signal, wherein the upper elastic element and the lower layer elastic element may be distributed up and down along a vibration direction of the mass element, and a projection of the upper elastic element or the lower layer elastic element along the vibration direction of the mass element has at least one symmetry axis.

In some embodiments, a count of the plurality of bar structures may be four.

In some embodiments, the projection of the upper elastic element or the lower layer elastic element along the vibration direction of the mass element may have two symmetry axes perpendicular to each other.

In some embodiments, adjacent bar structures of the plurality of bar structures of the upper elastic element or the lower elastic element may have opposite bending directions.

In some embodiments, a shape of the bar structure may include at least one of a broken line, an S-shape, a spline, an arc, or a straight line.

In some embodiments, at least one of the plurality of bar structures may include a plurality of segments, and the plurality of segments may have opposite bending directions.

BRIEF DESCRIPTION OF THE DRAWINGS

The present disclosure is further illustrated in terms of exemplary embodiments. These exemplary embodiments are described in detail with reference to the drawings. These embodiments are not restrictive, in which the same numbering indicates the same structure, wherein.

DETAILED DESCRIPTION

Figure 1:
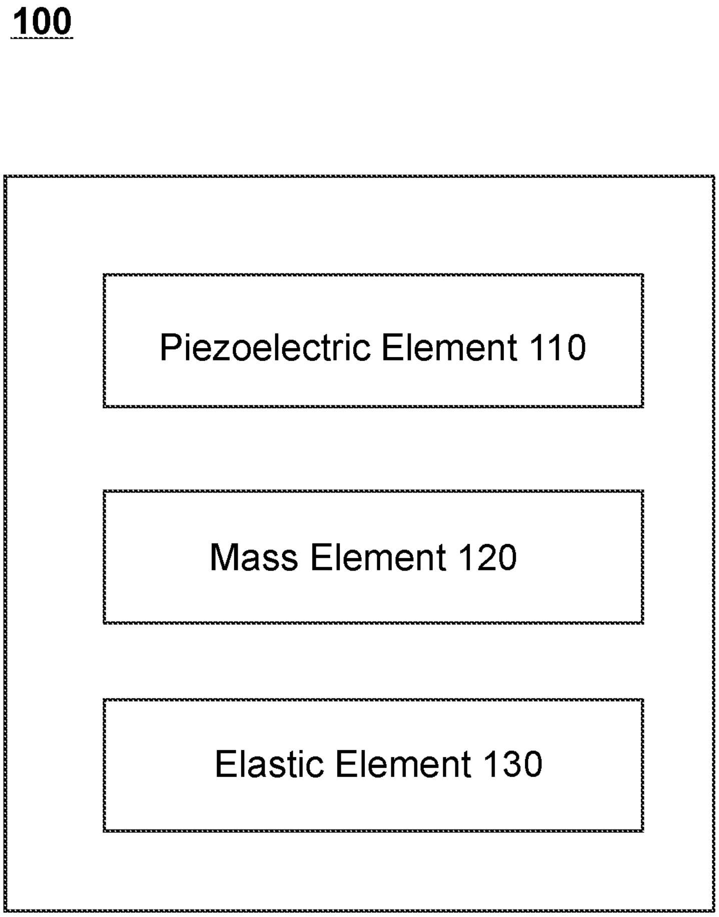
FIG. 1 is a block diagram illustrating an exemplary acoustic output device according to some embodiments of the present disclosure.

In order to illustrate the technical solutions of the embodiments of the present disclosure more clearly, the following will briefly introduce the drawings that need to be used in the description of the embodiments. Obviously, the drawings in the following description are only some examples or embodiments of the present disclosure. For those of ordinary skill in the art, without creative work, the present disclosure can be applied to other similar scenarios according to these drawings. Unless it is obvious from the language environment or otherwise stated, the same reference numbers in the drawings represent the same structure or operation.

It should be understood that the terms “system”, “apparatus”, “unit”, “component”, “module” and/or “block” may be a method that is used herein to distinguish different components, elements, parts, sections, or assemblies at different levels. However, the terms may be replaced by other expressions if they serve the same purpose.

As used in the present disclosure and the appended claims, the singular forms “a,” “an,” and “the” include plural referents unless the content clearly dictates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements.

Flowcharts are used in the present disclosure to illustrate operations performed by a system according to an embodiment of the present disclosure. It should be understood that the preceding or following operations are not necessarily performed in the exact order. Instead, the various operations may be processed in reverse order or simultaneously. Further, other actions may be added to these procedures, or an operation or operations may be removed from these procedures.

The acoustic output device provided in the embodiments of the present disclosure may include, but is not limited to a bone conduction speaker, an air conduction speaker, a bone conduction hearing aid, an air conduction hearing aid, etc. The acoustic output device provided in the embodiments of the present disclosure may include a piezoelectric element. The piezoelectric element may be configured to convert an electrical signal into a mechanical vibration. The piezoelectric element may convert an input voltage into a mechanical vibration under an action of an inverse piezoelectric effect, thereby outputting a vibration displacement. The acoustic output device that outputs a displacement through the piezoelectric element may be also called as a piezoelectric acoustic output device. A working mode of the piezoelectric element of the piezoelectric acoustic output device may include a d33 working mode and a d31 working mode. When the piezoelectric element is in the d33 working mode, a polarization direction of the piezoelectric element may be the same as a displacement output direction. When the piezoelectric element is in the d31 working mode, the polarization direction of the piezoelectric element may be perpendicular to the displacement output direction. Since the piezoelectric element may have a high resonance frequency, a high-frequency output of the piezoelectric acoustic output device may be improved. However, the piezoelectric element may have a poor low-frequency response and a plurality of vibration modes in the audible domain (e.g., 20 Hz-20000 Hz), which makes it difficult for the piezoelectric element to form a relatively flat frequency response curve, thereby affecting a sound quality of the sound output by the acoustic output device.

To solve the problem of poor low-frequency response and the plurality of modes in the audible domain of the piezoelectric acoustic output device, the acoustic output device provided in the embodiments of the present disclosure may include a mass element and an elastic element. A first resonance peak may be generated in the low-frequency range (e.g., 20 Hz-2000 Hz) using a combined structure of the elastic element and the mass element, and a second resonance peak may be generated in the high-frequency range (e.g., 1000 Hz-20000 Hz) using the piezoelectric element. In such cases, a flat curve may be obtained between the first resonance peak and the second resonance peak. Moreover, by configuring a shape and structure of the elastic element, the elastic element may provide shear stresses with opposite curl on a plane perpendicular to a vibration direction of the mass element, which may inhibit a rotation mode generated by a rotation of the mass element and/or the piezoelectric element on the plane, thereby improving a resonance valley generated by the rotation mode in the frequency response curve of the acoustic output device.

FIG. 1 is a block diagram illustrating an exemplary acoustic output device according to some embodiments of the present disclosure. In some embodiments, the acoustic output device 100 may include a piezoelectric element 110, a mass element 120, and an elastic element 130. In some embodiments, the mass element 120 may be connected to the piezoelectric element 110 through the elastic element 130. In some embodiments, there may be one elastic element 130, and the mass element 120 may be connected to the piezoelectric element 110 through the one elastic element 130. In some embodiments, there may be a plurality of elastic elements 130, and the mass element 120 may be connected to the piezoelectric element 110 through the one or more elastic elements 130. In some embodiments, there may be one or more piezoelectric elements 110. In some embodiments, the mass element 120 may be connected to the one piezoelectric element 110. In some embodiments, the mass element 120 may be further connected to the plurality of piezoelectric elements 110, respectively. In some embodiments, the plurality of piezoelectric elements 110 may be connected to each other. In some embodiments, the plurality of piezoelectric elements 110 may be directly connected to each other. In some embodiments, the plurality of piezoelectric elements 110 may be further connected to each other through the one or more elastic elements 130.

The piezoelectric element 110 may be an element with a piezoelectric effect. In some embodiments, the piezoelectric element 110 may include a piezoelectric ceramic, a piezoelectric polymer, and other materials with the piezoelectric effect. In some embodiments, the piezoelectric element 110 may be configured to convert an electrical signal into a mechanical vibration. For example, when an alternating electric signal is applied to the piezoelectric element 110, the piezoelectric element 110 may undergo a reciprocating deformation and generate the mechanical vibration. In some embodiments, a vibration direction of the piezoelectric element 110 may be the same as an electrical direction (also referred to as a polarization direction) of the piezoelectric element 110. In some embodiments, the vibration direction of the piezoelectric element 110 may be perpendicular to the electrical direction of the piezoelectric element 110.

In some embodiments, a count of the piezoelectric element(s) 110 may be one or multiple. In some embodiments, when there are a plurality of piezoelectric elements 110, the plurality of piezoelectric elements 110 may be connected to each other through the elastic element 130. In some embodiments, any one of the piezoelectric elements 110 connected to each other through the elastic element 130 may be connected to the mass element 120 through another elastic element 130. In some embodiments, the plurality of piezoelectric elements 110 may further be connected in series along the vibration direction of the plurality of piezoelectric elements 110 as a whole, and the piezoelectric elements 110 connected in series may be further connected to the mass element 120 through the elastic element 130.

In some embodiments, the piezoelectric element 110 may have a regular (e.g., circular, annular, rectangular, etc.) or irregular shape. For example, the piezoelectric element 110 may be an annular structure, and the annular structure may undergo a reciprocating deformation along an axis direction and generate the mechanical vibration. As another example, the piezoelectric element 110 may include a piezoelectric sheet and a beam structure. The piezoelectric sheet may generate the reciprocating deformation along a direction perpendicular to the polarization direction of the piezoelectric sheet, thereby driving the beam structure to wrap along the polarization direction of the piezoelectric sheet to generate the mechanical vibration. The direction of the mechanical vibration may be perpendicular to a direction of a long axis of the beam structure.

In some embodiments, the electrical direction (e.g., the polarization direction) of the piezoelectric element 110 may be the same as the mechanical vibration direction of the piezoelectric element 110. For example, the piezoelectric element 110 may vibrate along the polarization direction of the piezoelectric element 110 under an action of the electrical signal. Merely by way of example, the piezoelectric element 110 may include an annular structure. The annular structure may be a columnar structure with an annular end face. In some embodiments, the polarization direction of the piezoelectric element 110 may be parallel to the axis direction of the annular structure, and the piezoelectric element 110 may vibrate along the axis direction of the annular structure of the piezoelectric element 110 under the action of an electrical signal. The axis of the annular structure may be a virtual line connecting centroids of two annular end faces of the columnar structure and the centroid of any cross-section parallel to the annular end faces. In some embodiments, the axis direction of the annular structure may be perpendicular to an annular surface of the annular structure. In some embodiments, shapes of the annular end face of the annular structure may include, but are not limited to, a ring, an elliptical ring, a curved ring, or a polygonal ring. In some embodiments, the polarization direction of the piezoelectric element 110 may be parallel to the axis direction of the annular structure, and the piezoelectric element 110 may vibrate along the axis direction of the annular structure of the piezoelectric element 110 under the action of an electrical signal.

In some embodiments, the piezoelectric element 110 may include the piezoelectric sheet and a substrate. The substrate may be a beam structure, and the piezoelectric sheet may be attached to the beam structure. Under the action of the electric signal, the piezoelectric sheet may undergo a reciprocating deformation, thereby driving the beam structure to vibrate. Merely by way of an example, the piezoelectric sheet may be reciprocally deformed in the direction perpendicular to the polarization direction of the piezoelectric sheet under the action of the electrical signal. The reciprocating deformation may further drive the beam structure to warp along the polarization direction of the piezoelectric sheet to generate the mechanical vibration. The vibration direction of the mechanical vibration may be parallel to the electrical direction of the piezoelectric sheet.

The mass element 120 may be an element with a certain mass. In some embodiments, the mass element 120 may be a vibrating plate or a diaphragm of the acoustic output device 100 such that the acoustic output device 100 may output vibration through the mass element 120. In some embodiments, a material of the mass element 120 may be metallic or non-metallic. The metallic materials may include, but are not limited to a steel (e.g., a stainless steel, a carbon steel, etc.), a light alloy (e.g., an aluminum alloy, a beryllium copper, a magnesium alloy, a titanium alloy, etc.), or any combination thereof. The non-metallic materials may include, but are not limited to, a polymer material, a glass fiber, a carbon fiber, a graphite fiber, a silicon carbide fiber, etc. In some embodiments, a projection of the mass element 120 along the vibration direction of the mass element 120 may be a regular and/or irregular polygon, such as a circle, a ring, a rectangle, a pentagon, a hexagon, etc.

In some embodiments, the mass element 120 may be connected to the piezoelectric element 110 through the elastic element 130. The mass element 120 may receive the mechanical vibration of the piezoelectric element 110 and generate the acoustic signal. In some embodiments, a resonance of the mass element 120 and the elastic element 130 connected thereto may cause the acoustic output device 100 to generate a first resonance peak. A magnitude of a first resonance frequency corresponding to the first resonance peak may be affected by the mass of the mass element 120 and an elastic coefficient of the elastic element 130. In some embodiments, the frequency of the first resonance peak (also referred to as a first resonance frequency) may be expressed by equation(1):

$$f = \frac{1}{2\pi}\sqrt{\frac{k}{m}}, \tag{1}$$

where f denotes the first resonance frequency, m denotes the mass of the mass element 120, and k denotes the elastic coefficient of the elastic element 120. According to equation (1), the magnitude of the first resonance frequency corresponding to the first resonance peak may be adjusted by adjusting the mass of the mass element 120 and/or the elastic coefficient of the elastic element 120, such that the first resonance peak may be located within a desired frequency range.

In some embodiments, the mass element 120 may be connected to an inner side of the piezoelectric element 110 through the elastic element 130. In some embodiments, when the piezoelectric element 110 vibrates based on the electrical signal, the vibration may be transmitted to the mass element 120 through the elastic element 130, such that the mass element 120 may vibrate in the direction parallel to the vibration direction of the piezoelectric element 110. In some embodiments, the mass element 120 and the elastic element 130 may have one or more connection points. The projection of the connection point along the axis direction of the piezoelectric element 110 may be located within the projection of the piezoelectric element 110 along the axis direction of the piezoelectric element 110.

some embodiments, the mass element 120 may be connected to an outer side of the piezoelectric element 110 through the elastic element 130. For example, at least a portion of the mass element 120 may be an annular structure, and the mass element 120 may be connected to the piezoelectric element 110 through the annular structure. For example, the annular structure may be located outside the piezoelectric element 110, and an inner diameter of the annular structure may be greater than an outer diameter of the annular structure of the piezoelectric element 110, such that the projection of the annular structure of the mass element 120 along the axis direction of the piezoelectric element 110 may be located outside of the projection of the piezoelectric element 110 along the axis direction of the piezoelectric element 110.

In some embodiments, at least a portion of the mass element 120 may be located between the plurality of piezoelectric elements 110. In some embodiments, the piezoelectric element 110 may include a first piezoelectric element and a second piezoelectric element with different diameters, the second piezoelectric element may be disposed inside the first piezoelectric element, and at least a portion of the mass element 120 may be located between the first piezoelectric element and the second piezoelectric element. In some embodiments, the at least a portion of the mass element 120 may be an annular structure, and the projection of the annular structure of the mass element 120 along the axis direction of the piezoelectric element 110 may be located between the projections of the first piezoelectric element and the second piezoelectric element along the axis direction of the piezoelectric element 110.

In some embodiments, when the shape of the mass element 120 is annular, a cover plate may be disposed on one side of the mass element 120 away from the piezoelectric element 110 along the axis direction of the piezoelectric element 110. The cover plate may seal the side of the mass element 120 away from the piezoelectric element 110 along the axis direction of the piezoelectric element 110. For example, the mass element 120 may have a shape of a ring and the cover plate may be a circular structure. A peripheral side of the cover plate may be connected to the side of the mass element 120 away from the piezoelectric element 110 along the axis direction of the piezoelectric element 110. By disposing the cover plate on the side of the mass element 120 away from the piezoelectric element 110 along the axis direction of the piezoelectric element 110, the cover plate may be configured as a vibration plate for transmitting the vibration signal. In some embodiments, the cover plate may further be configured to connect the mass element 120 to other structures of the acoustic output device 100, such as the diaphragm, such that the acoustic output device 100 may drive, through the mass element 120, the diaphragm to vibrate.

The elastic element 130 may be an element capable of elastic deformation under the action of an external load. In some embodiments, the elastic element 130 may be a material with a good elasticity (i.e., prone to elastic deformation), such that the mass element 120 connected thereto may have good vibration response capability. In some embodiments, materials of the elastic element 130 may include, but are not limited to, one or more of a metal material, a polymer material, a rubber material, etc. In some embodiments, the count of the elastic elements 130 may be one or multiple. In some embodiments, the mass element 120 may be connected to the piezoelectric element 110 through the elastic element 130. For example, the elastic element 130 may have an annular shape. The mass element 120 and the piezoelectric element 110 may be connected to each other through the annular elastic element 130. In some embodiments, the mass element 120 may be connected to the piezoelectric element 110 through a plurality of elastic elements 130. For example, the elastic element 130 may include a bar structure, and the plurality of elastic elements 130 may be distributed along a circumference of the piezoelectric element 110 and connected to the mass element 120.

In some embodiments, the elastic element 130 may be a vibration plate. When the mass element 120 is connected to the piezoelectric element 110 through the elastic element 130, the elastic element 130 may transmit the vibration generated by the piezoelectric element 110 to the mass element 120 such that the mass element 120 may vibrate. In some embodiments, the elastic element 130 may be a connection bar disposed on the vibration plate, such that a manufacturing process of the acoustic output device 100 may be simpler and faster.

In some embodiments, the elastic element 130 may be a single-layer structure, which means that the one or more elastic elements 130 are located on a same plane perpendicular to the axis direction of the piezoelectric element 110. In some embodiments, the elastic element 130 may be a multi-layer structure, which means that the plurality of elastic elements are located on different planes perpendicular to the axis direction of the piezoelectric element 110.

In some embodiments, the shapes of the elastic element 130 may include, but are not limited to at least one of a broken line, an S-shape, a spline, an arc, and/or a straight line. The shape of the elastic element 130 may be determined according to a requirement of the acoustic output device 100 (e.g., the position of the first resonance peak, the difficulty of processing the acoustic output device 100, etc.).

In some embodiments, during the vibration of the acoustic output device 100, as the elastic element 130 has a curved shape, on a plane where the curved shape is located, the elastic element 130 may provide a shear stress to the mass element 120 (and/or the piezoelectric element 110). When the plurality of elastic elements 130 provide shear stresses with a same curl to the mass element 120, the mass element 120 (and/or the piezoelectric element 110) may tend to rotate around a central axis of the mass element 120. The shear stress may be a stress provided by the elastic element 130 to the mass element 120 (and/or the piezoelectric element 110), which is tangent to any section of the mass element 120 perpendicular to the vibration direction of the mass element 120. In some embodiments, on the plane perpendicular to the vibration direction of the mass element 120, at least two portions of the elastic element 130 (e.g., an upper elastic element and a lower elastic element of the elastic element, a first bending region 211 and a second bending region 212 of a bar structure 210, etc.) may provide shear stresses with opposite curls. In some embodiments, the elastic element 130 may be connected to the mass element 120 (and/or the piezoelectric element 110). To avoid a rotation tendency of the mass element 120 (and/or the piezoelectric element 110) connected to the elastic element 130, at least two portions of the elastic element 130 may provide shear stresses with opposite curls to the mass element 120 (and/or the piezoelectric element 110). The curl (also referred to as a curl vector) may be a vector operator used to measure a rotation property of the vector field of the shear stress. A magnitude of the vector operator may indicate a degree of rotation of the shear stress vector field. A direction of the vector operator may indicate the direction of rotation of the shear stress vector field. The direction of the curl vector may be determined based on a rotation direction according to a right-hand rule. For example, when the piezoelectric element 110 rotates in response to the shear stress provided by the elastic element 130, according to the right-hand rule, a bending direction of four fingers may be consistent with the rotation (or rotation tendency) direction of the annular structure, and the direction of the thumb at this time may be the direction of the curl vector. In some embodiments, the elastic element 130 may at least include two portions, and the two portions provide shear stresses with opposite curls to the mass element 120 (and/or the piezoelectric element 110), such that the shear stresses with opposite curls may cancel each other. In such cases, the shear stresses provided by the elastic element 130 to the mass element 120 as a whole may be zero or close to zero, thereby preventing or reducing the rotation of the mass element 120.

In some embodiments, the elastic element 130 may include a plurality of bar structures. Each bar structure may include one or more bending regions (e.g., the first bending region 211, the second bending region 212 shown in FIG. 2, etc.). The shear stress provided by each bending region may correspond to a curl. In some embodiments, the directions of the curls corresponding to the shear stresses provided by the one or more bending regions may be the same or different. In some embodiments, the directions of the curls corresponding to the shear stresses provided by the one or more bending regions may be opposite.

In some embodiments, when there are a plurality of elastic elements 130, the curls corresponding to the shear stresses provided by the bending regions of adjacent elastic elements 130 may be different. In some embodiments, when the elastic element 130 is the single-layer structure, a projection of the plurality of the elastic elements 130 along the vibration direction of the mass element 120 may have two symmetry axes perpendicular to each other, such that the curls corresponding to the shear stresses provided by the bending regions of the adjacent elastic elements 130 may be different.

In some embodiments, when the elastic element 130 is the multi-layer structure, the curls corresponding to the shear stresses provided by the bending regions of the elastic element 130 of different layers may be different. In some embodiments, the elastic element 130 may be a double-layer structure, and the curls of the shear stresses provided by the double-layer structure may be opposite. Merely by way of example, the elastic element 130 may include a first helical structure and a second helical structure. The first helical structure and the second helical structure may connect the mass element 120 and the piezoelectric element 110 in different planes perpendicular to the axis direction of the piezoelectric element 110. In some embodiments, the first helical structure and the second helical structure may have a same axis and opposite helical directions. By disposing the first helical structure and the second helical structure with opposite helical directions, the curls of the shear stresses provided by the elastic element 130 of different layers to the mass element 120 (and/or piezoelectric element 110) may be opposite, such that the shear stresses provided by the elastic element 130 of the different layers to the mass element 120 may cancel each other, thereby preventing the mass element 120 from rotating. More description regarding the bending region of the elastic element 130 may be found in FIGS. 2-8B and the relevant descriptions thereof in the present disclosure.

In some embodiments, the acoustic output device 100 may generate at least two resonance peaks in an audible domain. In some embodiments, a resonance of the elastic element 130 and the mass element 120 may generate a first resonance peak. A resonance of the piezoelectric element 110 may generate a second resonance peak. In some embodiments, a frequency corresponding to the first resonance peak (also referred to as a first resonance frequency) may be in a low-frequency range (e.g., less than 2000 Hz), and a frequency corresponding to the second resonance peak (also referred to as a second resonance frequency) may be in a medium and high-frequency range (e.g., greater than 1000 Hz). In some embodiments, the second resonance frequency corresponding to the second resonance peak may be higher than the first resonance frequency corresponding to the first resonance peak. In some embodiments, a relatively flat curve instead of a resonance valley may be formed between the second resonant peak and the first resonant peak, thereby improving a sound quality of sound output by the acoustic output device 100.

In some embodiments, according to equation (1), the frequency range of the first resonance frequency corresponding to the first resonance peak may be adjusted by adjusting the mass of the mass element 120 and/or the elastic coefficient of the elastic element 130. In some embodiments, the frequency range of the first resonance frequency corresponding to the first resonance peak may be 50 Hz-2000 Hz. In some embodiments, the frequency range of the first resonance frequency corresponding to the first resonance peak may be 50 Hz-1500 Hz. In some embodiments, the frequency range of the first resonance frequency corresponding to the first resonance peak may be 50 Hz-1000 Hz. In some embodiments, the frequency range of the first resonance frequency corresponding to the first resonance peak may be 50 Hz-500 Hz. In some embodiments, the frequency range of the first resonance frequency corresponding to the first resonance peak may be 50 Hz-200 Hz.

In some embodiments, the frequency range of the second resonance frequency corresponding to the second resonance peak may be adjusted by adjusting a structural parameter (e.g., a size, a shape, a mass, a material, etc.) of the piezoelectric element 110. In some embodiments, the second resonance frequency may be a natural frequency of the piezoelectric element 110. In some embodiments, the frequency range of the second resonance frequency corresponding to the second resonance peak may be 1000 Hz-50000 Hz. In some embodiments, the frequency range of the second resonance frequency corresponding to the second resonance peak may be 1000 Hz-40000 Hz. In some embodiments, the frequency range of the second resonance frequency corresponding to the second resonance peak may be 1000 Hz-30000 Hz. In some embodiments, the frequency range of the second resonance frequency corresponding to the second resonance peak may be 1000 Hz-20000 Hz. In some embodiments, the frequency range of the second resonance frequency corresponding to the second resonance peak may be 1000 Hz-10000 Hz. In some embodiments, the frequency range of the second resonance frequency corresponding to the second resonance peak may be 2000 Hz-10000 Hz. In some embodiments, the frequency range of the second resonance frequency corresponding to the second resonance peak may be 3000 Hz-10000 Hz.

In some embodiments, to make the frequency response curve of the acoustic output device 100 have a relatively large flat region between the first resonance peak and the second resonance peak, so as to improve the low-frequency response of the acoustic output device 100 and the sound quality of the output sound, a ratio of the second resonance frequency corresponding to the second resonance peak to the first resonance frequency corresponding to the first resonance peak may be in a range of 20-200. In some embodiments, the ratio of the second resonance frequency corresponding to the second resonance peak to the first resonance frequency corresponding to the first resonance peak may be in a range of 30-180. In some embodiments, the ratio of the second resonance frequency corresponding to the second resonance peak to the first resonance frequency corresponding to the first resonance peak may be in a range of 40-160. In some embodiments, the ratio of the second resonance frequency corresponding to the second resonance peak to the first resonance frequency corresponding to the first resonance peak may be in a range of 50-150.

In some embodiments, the elastic element may be used to connect the piezoelectric element and the mass element to transmit the vibration. In such cases, a structure of the elastic element may influence a vibration feature of the acoustic output device. In some embodiments, to satisfy a requirement of the elastic element on the elastic coefficient, the elastic element may have a curve shape so as to increase a length of the elastic element, thereby reducing the elastic coefficient of the elastic element. In such cases, if the elastic element has a rotational or asymmetric shape, a shear stress may be provided to the mass element on a plane perpendicular to the vibration direction of the mass element, such that when the mass element of the acoustic output device vibrates, a rotation mode may be generated and affect the output of the acoustic output device (which may appear as a resonance valley in the frequency response curve), which may affect a vibration performance of the acoustic output device. In such cases, the structure of the elastic element may be reasonably designed to improve the vibration performance of the acoustic output device.

In some embodiments, the elastic element may include a plurality of bar structures. The mass element and the piezoelectric element may be connected to each other through the plurality of bar structures. The plurality of bar structures may be disposed along the circumference of the mass element. In some embodiments, the plurality of bar structures may be symmetrically disposed in the circumferential direction of the mass element, such that in the case that rotation modes may be generated in the acoustic output device, the rotation modes may cancel each other due to the symmetry of the elastic element (e.g., the shear stresses provided by the plurality of bar structures to the mass element has opposite curls) so that, thereby reducing or eliminating the resonance valley generated by the rotation mode.

In some embodiments, the shape of the bar structure may include at least one of a broken line, an S-shape, a spline, an arc, and/or a straight line. In some embodiments, when a bar structure has different shapes, the bar structure may have different bending regions, and the shear stresses provided to the mass element (and/or the piezoelectric element) by the different bending regions may correspond to different curls. In some embodiments, with a connection line between two ends of the bar structure as a reference line, the bar structure may include subsections connected alternately on both sides of the reference line, and a section including a plurality of subsections with a same alternating rule may be the bending region of the bar structure. Taking the shape of the elastic element being a broken line as an example, the broken line may be bent towards a first side of the reference line, then bent towards a second side of the reference line, and then bent towards the first side again, which may be repeated cyclically. Then a bending region of the broken line may be obtained when a cycle rule changes.

Figure 2:
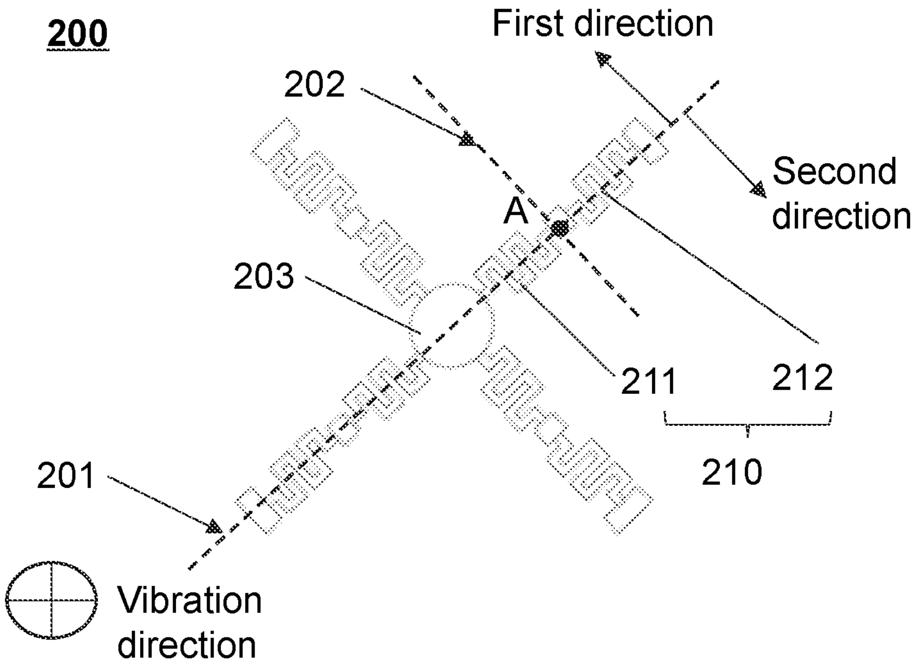
FIG. 2 is a structural diagram illustrating an exemplary elastic element according to some embodiments of the present disclosure.

FIG. 2 is a structural diagram illustrating an exemplary elastic element according to some embodiments of the present disclosure. As shown in FIG. 2, in some embodiments, an elastic element 200 may include a plurality of bar structures 210, and each bar structure may include one or more bending regions. The shear stress provided by each bending region may correspond to a curl. For example, each bar structure 210 of the elastic element 200 in FIG. 2 may include two bending regions: a first bending region 211 and a second bending region 212. The first bending region 211 and the second bending region 212 may be connected end to end to form the bar structure 210. In some embodiments, the first bending region may have a first bending direction, and the second bending region may have a second bending direction. The bending direction may be a direction indicating a direction of an alternating rule of a plurality of subsections on two sides of a reference line. As shown in FIG. 2, the bending direction of the first bending region 211 may be the first direction, and the bending direction of the second bending region 212 may be the second direction, and the first direction and the second direction may be opposite relative to the reference line of the bar structure 210 (as shown by a dotted line 201 in FIG. 2). In some embodiments, the first direction may be a counterclockwise direction relative to a projection center of the elastic element in a projection plane along a vibration direction of a piezoelectric element, and the second direction may be a clockwise direction relative to the projection center of the elastic element in the projection plane along the vibration direction of the piezoelectric element.

In some embodiments, the plurality of bar structures 210 of the elastic element 200 may be located on the same plane perpendicular to the vibration direction of the mass element 203. Or in other words, the plurality of bar structures 210 of the elastic element 200 may be located on a same plane, and the plane may be perpendicular to the vibration direction of the mass element 203.

In some embodiments, at least one of the plurality of bar structures 210 may include a plurality of segments. The plurality of bar structures 210 may provide shear stresses with opposite curls to the mass element 203. In some embodiments, the bar structure 210 may include two segments, i.e., the first bending region 211 and the second bending region 212. The first bending region 211 and the second bending region 212 may provide shear stresses with opposite curls to the mass element 203. For example, when the elastic element 200 vibrates, the first bending region 211 of the bar structure 210 may make the mass element 120 have a rotation tendency on the plane perpendicular to the vibration direction, and a rotation direction corresponding to the rotation tendency may be the first direction. The first bending region 211 may provide a shear stress along the first direction to the mass element 203 connected thereto. The shear stress provided by the first bending region 211 to the mass element 203 may have a first curl. Similarly, when the elastic element 200 vibrates, the second bending region 212 of the bar structure 210 may also make the mass element 120 have a rotation tendency on the plane perpendicular to the vibration direction, and a rotation direction corresponding to the rotation tendency may be the second direction. The second bending region 212 may provide a shear stress along the second direction to the first bending region 211 connected thereto, such that the mass element 203 may have the rotation tendency in the second direction, which may be equivalent to providing an indirect shear stress along the second direction to the mass element 203. To facilitate description, in some embodiments, the shear stress indirectly provided by the elastic element or a portion thereof to the mass element may be referred to as a shear stress provided by the elastic element or the part thereof to the mass element. In such cases, the shear stress provided by the second bending region 212 to the mass element 203 may have a second curl.

In some embodiments, different bending regions of the bar structure 210 may provide shear stresses with opposite curls to the mass element 203. As shown in FIG. 2, the bending directions of the first bending region 211 and the second bending region 212 are opposite. During the vibration process, the directions of the rotation tendencies of the first bending region 211 and the second bending region 212 on the plane perpendicular to the vibration direction may be opposite, such that the curl of the shear stress provided by the first bending region 211 to the mass element 203 may be opposite to the curl of the shear stress provided by the second bending region 212 to the mass element 203. For example, the curl of the shear stress provided by the first bending region 211 to the mass element 203 may point outside of a paper plane, and the curl of the shear stress provided by the second bending region 212 to the mass element 203 may point toward the paper plane.

In some embodiments, the first bending region 211 may provide a first shear stress of the first curl to the mass element 203, the second bending region 212 may provide the second shear stress of the second curl to the mass element 203. The directions of the first curl and the second curl may be opposite. An opposite action between the first shear stress and the second shear stress may make a first rotation mode caused by the rotation of the first bending region 211 and a second rotation mode caused by the rotation of the second bending region 212 cancel each other, thereby reducing or eliminating the resonance valley generated by the rotation modes.

In some embodiments, the bar structure 210 may include a plurality of segments, for example, the bar structure 210 may not only include the first bending region 211 and the second bending region 212, but may also include more bending regions. For example, a third bending region, a fourth bending region, etc. When the bar structure 210 includes a plurality of segments, the curls of the shear stresses provided by adjacent segments of the plurality of segments to the mass element 203 may be opposite.

In some embodiments, the projection of at least one of the plurality of bar structures 210 along the vibration direction of the mass element 203 may have at least one symmetry axis. The bar structures located on both sides of the symmetry axis may provide shear stresses with opposite curls to the mass element 203. For example, as shown in FIG. 2, the bar structure 210 may include the first bending region 211 and the second bending region 212, and the projection of the bar structure 210 along the vibration direction of the mass element 203 may have a symmetry axis 202. The symmetry axis 202 may be a straight line passing through a connection point A of the first bending region 211 and the second bending region 212 and perpendicular to the reference line 201 of the bar structure 210. The shear stresses provided by the bar structures on both sides of the symmetry axis 202 to the mass element 203 may have opposite curls.

In some embodiments, the elastic element may include a plurality of bar structures. In some embodiments, when the plurality of bar structures are located on the same plane perpendicular to the vibration direction of the mass element, the plurality of bar structures may be disposed in a certain manner such that the projections of the bar structures along the vibration direction of the mass element may have at least two symmetry axes perpendicular to each other.

Figure 3:
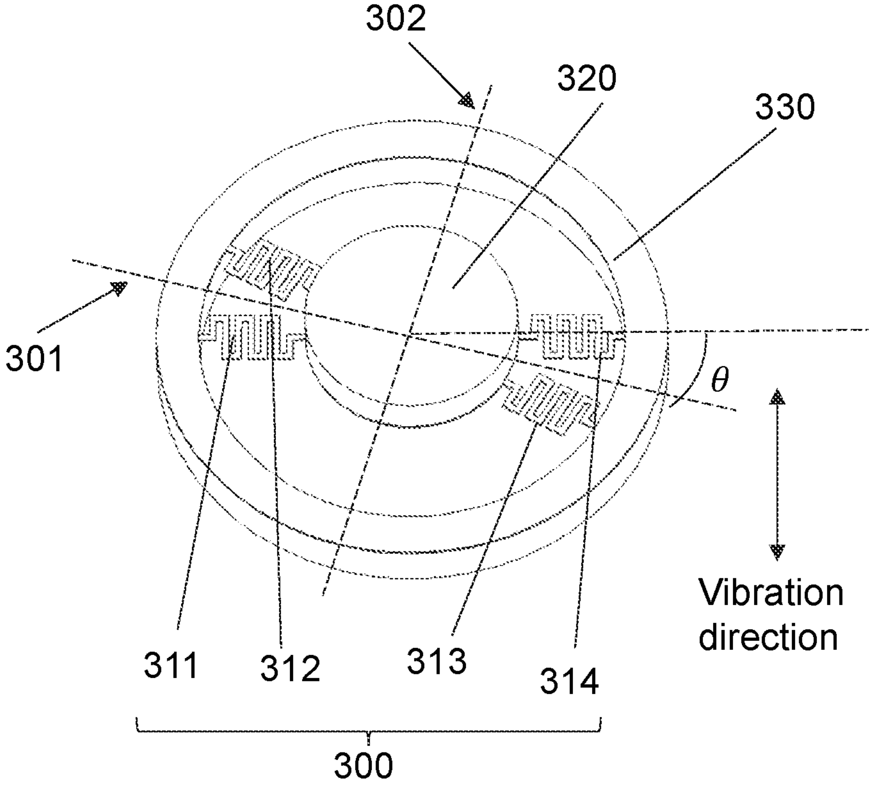
FIG. 3 is a structural diagram illustrating an exemplary elastic element according to some embodiments of the present disclosure.

FIG. 3 is a structural diagram illustrating an exemplary elastic element according to some embodiments of the present disclosure. In some embodiments, a count of the plurality of bar structures of an elastic element 300 may be an even number (e.g., 4, 8, etc.). As shown in FIG. 3, in some embodiments, the count of the bar structures connecting the mass element 320 and the piezoelectric element 330 may be four, for example, a first bar structure 311, a second bar structure 312, a third bar structure 313 and a fourth bar structure 314. The four bar structures may form an X-shape. In some embodiments, curls of the shear stresses provided by adjacent bar structures of the four bar structures to the mass element 320 may be opposite, and the curls of the shear stresses provided by the opposite bar structures to the mass element 320 may be the same. For example, the curls of the shear stresses provided by the first bar structure 311 and the second bar structure 312 to the mass element 320 may be opposite, and the curls of the shear stresses provided by the third bar structure 313 and the fourth bar structure 314 to the mass element 320 may be opposite. The curls of the shear stresses provided by the first bar structure 311 and the fourth bar structure 314 to the mass element 320 may be the same, and the curls of the shear stresses provided by the second bar structure 312 and the third bar structure 313 to the mass element 320 may be the same. When the four bar structures are disposed in the X-shape, the projection(s) of the four bar structures along the vibration direction of the mass element 320 may have two symmetry axes perpendicular to each other, i.e., a first symmetry axis 301 and a second symmetry axis 302.

In some embodiments, in the elastic element 300, an included angle may be formed between a single bar structure and the symmetry axis (e.g., the first symmetry axis 301 or the second symmetry axis 302). For example, an included angle may be formed between the fourth bar structure 314 and the first symmetry axis 301. By adjusting the included angle, a rolling mode of the acoustic output device along different symmetry axes during the vibration may be adjusted. The rolling may refer to a rotation of the elastic element 300 around the first symmetry axis 301 or the second symmetry axis 302 during the vibration. In some embodiments, to reduce the rolling mode during the vibration of the acoustic output device, the included angle may be in a range of 10°-30°. In some embodiments, to reduce the rolling mode during the vibration of the acoustic output device, the included angle may be in a range of 30°-60°. In some embodiments, to reduce the rolling mode during the vibration of the acoustic output device, the included angle may be in a range of 60°-80°.

Figure 4:
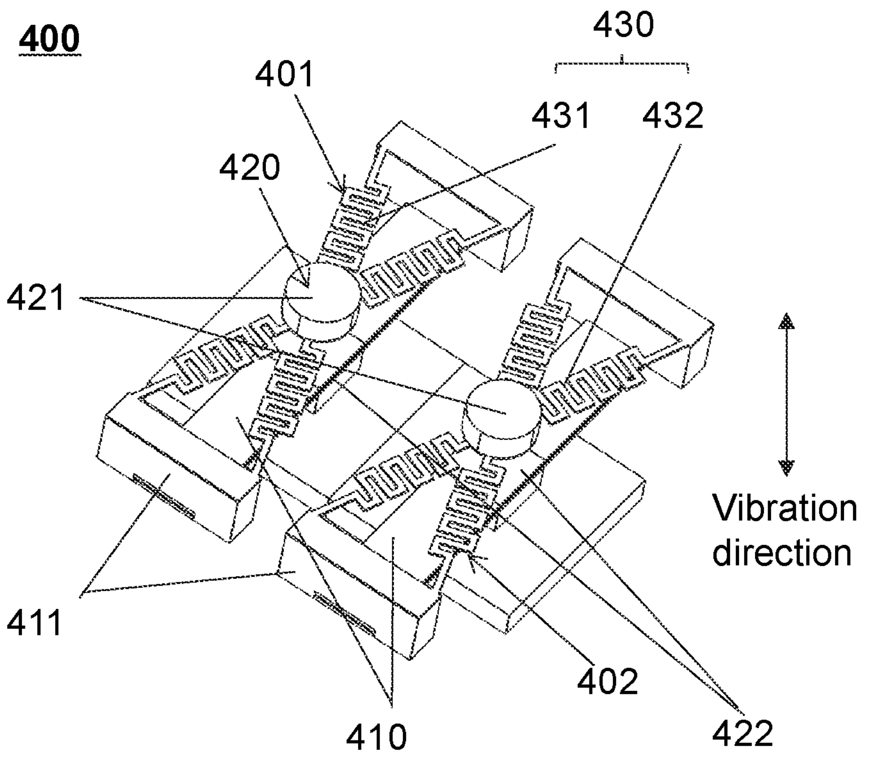
FIG. 4 is a structural diagram illustrating an exemplary elastic element according to some embodiments of the present disclosure.

In some embodiments, the piezoelectric element 330 of the acoustic output device may be an annular structure (as shown in FIG. 3). The plurality of bar structures of the elastic element 300 may be disposed along a circumference of the annular structure. The mass element 320 may be connected to the piezoelectric element 330 through the plurality of bar structures. It should be noted that when the elastic elements are disposed in different shapes (e.g., an X shape), the piezoelectric element 330 is not limited to the annular structure shown in FIG. 3. That is, the piezoelectric element 330 may have other shapes, for example, a piezoelectric beam structure (as shown in FIG. 4). More description regarding the structure of the piezoelectric element 330 may be found in FIGS. 9-24 and the relevant descriptions thereof in the present disclosure.

FIG. 4 is a structural diagram illustrating an exemplary elastic element according to some embodiments of the present disclosure. As shown in FIG. 4, an acoustic output device 400 may include a first elastic element 431 and a second elastic element 432. The second elastic element 432 and the first elastic element 431 may be connected to a mass element 420, respectively. In some embodiments, a piezoelectric element 410 of the acoustic output device 400 may include a beam structure, and the mass element 420 may be connected to a middle part of the beam structure. For example, the mass element 420 may include a first mass element 421 and a second mass element 422, and the second mass element 422 may be connected to the middle part of the beam structure. The second elastic element 432 and the first elastic element 431 may be connected to the first mass element 421, respectively. In some embodiments, one surface or a group of opposite surfaces of the beam structure may be attached with a piezoelectric sheet(s) (the one surface or the group of surfaces may be also referred to as a piezoelectric surface(s)). The piezoelectric sheet may be stretched and deformed based on an electrical signal such that the beam structure may generate a vibration perpendicular to the piezoelectric surface based on the electrical signal. In some embodiments, connection pieces 411 may be disposed at both ends of the beam structure. The beam structure may be connected to one end of the bar structure(s) of the first elastic element 431 (and the second elastic element 432) through the connection pieces 411 at both ends. The other end of the bar structure(s) of the first elastic element 431 (and the second elastic element 432) may be connected to the mass element 420.

In some embodiments, the second elastic element 432 and the first elastic element 431 may be located on a same plane. The plane where the second elastic element 432 and the first elastic element 431 are located may be perpendicular to the vibration direction of the mass element 420. In some embodiments, when the piezoelectric element 410 is a beam structure, the plane where the second elastic element 432 and the first elastic element 431 are located may be parallel to the piezoelectric surface of the beam structure. In some embodiments, the piezoelectric element 410 may be an annular structure. In such cases, the plane where the second elastic element 432 and the first elastic element 431 are located may be parallel to an annular surface of the annular structure.

Figure 5:
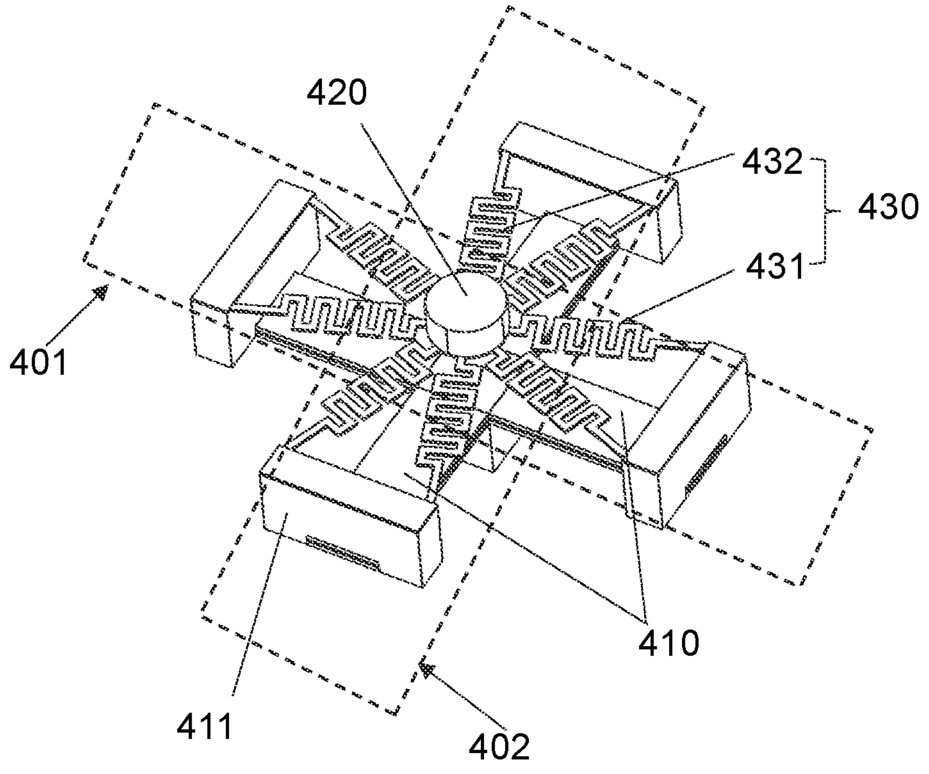
FIG. 5 is a structural diagram illustrating an exemplary elastic element according to some embodiments of the present disclosure.

In some embodiments, the count of bar structures of the elastic element 430 may be 8. The 8 bar structures may form a double X-shape. Four bar structures in the first elastic element 431 may form a first X-shape 401, four bar structures in the second elastic element 432 may form a second X-shape 402, and the first X-shape 401 and the second X-shape 402 may form a double X-shape structure of the plurality of bar structures. In some embodiments, the double X-shape structure formed by the plurality of bar structures may be a parallel double X-shape (as shown in FIG. 4), a vertical double X-shape (as shown in FIG. 5) or other inversely symmetrical shapes. The parallel/perpendicular double X-shape may refer to that two symmetry axes of the first X-shape 401 and two symmetry axes of the second X-shape 402 are parallel/perpendicular, respectively. In some embodiments, any one of the double X-shape structures shown in FIG. 4 may be the same as or similar to the X-shape structure shown in FIG. 3. For example, in the four bar structures in the first elastic element 431 and/or the second elastic element 432, the curls of the shear stresses provided by adjacent bar structures to the mass element 420 may be opposite, and the curls of the shear stress provided by opposite bar structures to the mass element 420 may be the same.

In some embodiments, a central axis of the second elastic element 432 and a central axis of the first elastic element 431 may be disposed in parallel. The central axis of the first elastic element 431 (and/or the second elastic element 432) may be an axis that passes through an intersection of extension lines of straight lines where the four bar structures are located, and may be perpendicular to the plane where the first elastic element 431 (and/or the second elastic element 432) is located. In some embodiments, the central axis of the first elastic element 431 (and/or the second elastic element 432) may be parallel to the vibration direction of the mass element 420. In some embodiments, when the central axis of the second elastic element 432 is parallel to the central axis of the first elastic element 431, the double X-shape structure formed by the plurality of bar structures of the elastic element 430 may be the parallel double X-shape structure. In some embodiments, the four bar structures of the first elastic element 431 forming the first X-shape 401 may be connected to one piezoelectric element 410 (e.g., the beam structure) through the connection pieces 411, the four bar structures of the second elastic element 432 forming the second elastic element 432 may be connected to another piezoelectric element 410 (e.g., the beam structure) through the connection pieces 411, and the two piezoelectric elements 410 may be disposed parallel to each other on the same plane. The four bar structures forming the first X-shape 401 and the four bar structures forming the second X-shape 402 may be further connected to the mass element 420, respectively. In some embodiments, there may be one mass element 420, or there may be a plurality of mass elements 420, and the plurality of mass elements 420 may be rigidly connected to each other (not shown in the figure).

FIG. 5 is a structural diagram illustrating an exemplary elastic element according to some embodiments of the present disclosure. As shown in FIG. 5, in some embodiments, the second elastic element 432 may be coaxial with the first elastic element 431. That is, a central axis of the second elastic element 432 may coincide with a central axis of the first elastic element 431. In some embodiments, projections of a double X-shape structure formed by a plurality of bar structures of the elastic element 430 along a vibration direction may be double X-shapes perpendicular to each other. The double X-shapes perpendicular to each other may be that symmetry axes of the two X-shapes are perpendicular to each other. In some embodiments, the second elastic element 432 and the first elastic element 431 may be located on a same plane perpendicular to the vibration direction. In some embodiments, the second elastic element 432 and the first elastic element 431 may be located on different planes perpendicular to the vibration direction. In some embodiments, any one of the double X-shaped structures shown in FIG. 5 may be the same as or similar to the X-shape structure shown in FIG. 3. For example, in the four bar structures of the first elastic element 431 and/or the second elastic element 432, curls of shear stresses provided by adjacent bar structures to the mass element 420 may be opposite, and curls of shear stresses provided by opposite bar structures to the mass element 420 may be the same.

In some embodiments, the four bar structures forming the first X-shape 401 may be connected to a piezoelectric element (e.g., a beam structure) through the connection pieces 411, the four bar structures forming the second X-shape 402 may be connected to another piezoelectric element (e.g., the beam structure), and the two piezoelectric elements may be disposed on the same plane and perpendicularly to each other.

Figure 6:
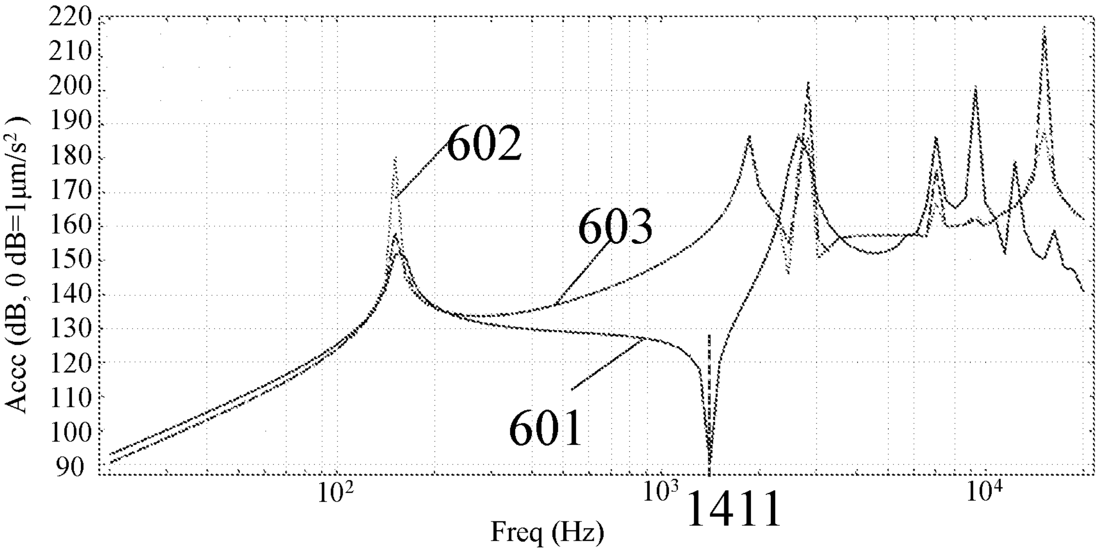
FIG. 6 is a graph illustrating frequency response curves of an acoustic output device according to some embodiments of the present disclosure.

In some embodiments, acoustic output devices with elastic elements of different shapes and/or structures may have different vibration performances. The higher the degree of an inverse symmetry of the elastic element, the less rotation modes are generated during the vibration of the elastic element, and the higher the vibration performance of the acoustic output device. FIG. 6 is a graph illustrating frequency response curves of an acoustic output device according to some embodiments of the present disclosure. As shown in FIG. 6, an abscissa denotes a resonance frequency of the acoustic output device in Hz, and an ordinate denotes an acceleration output intensity of the acoustic output device in dB. A curve 601 denotes the frequency response curve of the acoustic output device when the elastic element has a single X-shape (e.g., the elastic element 300 in FIG. 3), a curve 603 denotes the frequency response curve of the acoustic output device when the elastic element has a parallel double X-shape (e.g., the elastic element 430 in FIG. 4), and a curve 603 denotes the frequency response curve of the acoustic output device when the elastic element has a non-parallel double X-shape (e.g., the elastic element 430 in FIG. 5). According to the curves 601, 602 and 603, the acoustic output device may have a well frequency response when the elastic element has a single X-shape, a parallel double X-shape, or other types of double X-shapes. It should be noted that when the elastic element has the single X-shape, the curve 601 may have a resonance valley near 1411 Hz. The resonance valley is not generated due to the rotation mode of the elastic element, but is caused by a vibration absorption of the output end by a vibration system including the piezoelectric element and the mass element connected to the piezoelectric element. For example, referring to FIG. 4, the resonance valley may be generated because the vibration system including the second mass element 422 and the piezoelectric beam 410 absorbs the vibration of the first mass element 421.

In some embodiments, the elastic elements may have a double-layer structure, and the double-layer elastic elements may be distributed up and down along the vibration direction of the mass element. In some embodiments, the curls of the shear stresses provided by an upper elastic element and a lower elastic element to the mass element may be opposite. For example, the curls of the shear stresses provided by a plurality of bending regions of the upper elastic element may be respectively opposite to the curls of the shear stress provided by a plurality of bending regions of the lower elastic element. In some embodiments, the curls of the shear stresses provided by each layer of the elastic elements to the mass element may be opposite. For example, each layer of elastic elements may at least include two portions, and the at least two portions may provide shear stresses with opposite curls to the mass element. The shear stresses with opposite curls may cancel each other such that the shear stress provided to the mass element by each layer of the elastic elements may be zero or close to zero.

In some embodiments, a shape of the double-layer elastic element may be any one of a double-layer broken line, a double-layer S-shape, a double-layer spline, or a double-layer arc. For example, the first layer of the double-layer elastic element may include a plurality of broken line bar structures disposed along a first direction, and the second layer may include a plurality of broken line bar structures disposed along a second direction. The first direction and the second direction may be opposite relative to a reference line of the bar structure. As another example, each layer of the double-layer elastic element may include a plurality of bar structures, and a projection of the plurality of bar structures in each layer along the vibration direction of the mass element may have two symmetry axes perpendicular to each other (e.g., the double-layer elastic elements 300).

In some embodiments, when the elastic element has the double-layer structure, in the plurality of bending regions of each bar structure of the elastic element on the same layer, the curls of the shear stresses provided by adjacent bending regions may be opposite. In some embodiments, along the vibration direction of the mass element, the curls of the shear stresses provided by two opposite bar structures on different layers may also be opposite.

Figure 7A:
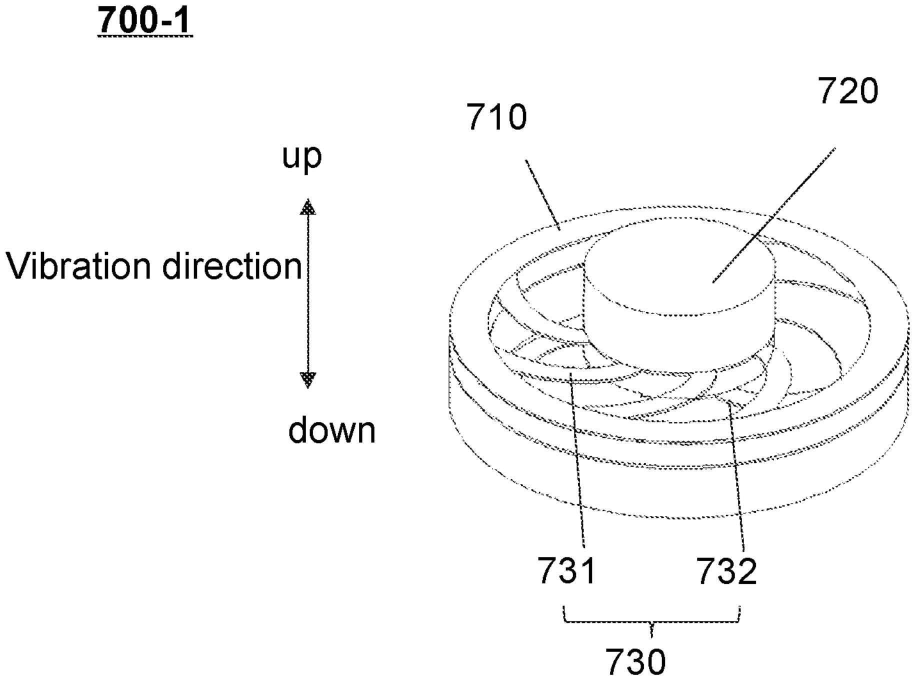
FIG. 7A is a structural diagram illustrating an exemplary elastic element according to some embodiments of the present disclosure.

FIG. 7A is a structural diagram illustrating an exemplary elastic element according to some embodiments of the present disclosure. Referring to FIG. 7A, an elastic element 730 may include a first helical structure 731 and a second helical structure 732. Each of the first helical structure 731 and the second helical structure 732 may be connected to a mass element 720 and a piezoelectric element 710. In some embodiments, the first helical structure 731 and the second helical structure 732 may be disposed up and down along the vibration direction of the mass element 720. A connection position between the first helical structure 731 and the piezoelectric element 710 may be at one side of the piezoelectric element 710 closer to the mass element 720. A connection position between the second helical structure 732 and the piezoelectric element 710 may be at one side of the piezoelectric element 710 away from the mass element 720.

In some embodiments, the first helical structure 731 and the second helical structure 732 may have a same axis and opposite helical directions. The helical direction may be a direction in which the helical structure rotates about an axis thereof. In some embodiments, at least two elastic elements 730 may rotate in opposite directions along the same axis to form a first helical structure 731 and a second helical structure 732 with opposite helical directions.

In some embodiments, by disposing the elastic element 730 as a double-layer helical structure, a rotation range of the elastic element 730 during the vibration of an acoustic output device 700-1 may be reduced. Moreover, the double-layer helical structure may further increase an elastic coefficient of the elastic element 730, which may cause the first resonance peak generated by the resonance of the elastic element 730 and the mass element 720 to move to the right (that is, to the high frequency), thereby satisfying a vibration performance requirement of the acoustic output device 700-1.

Figure 7B:
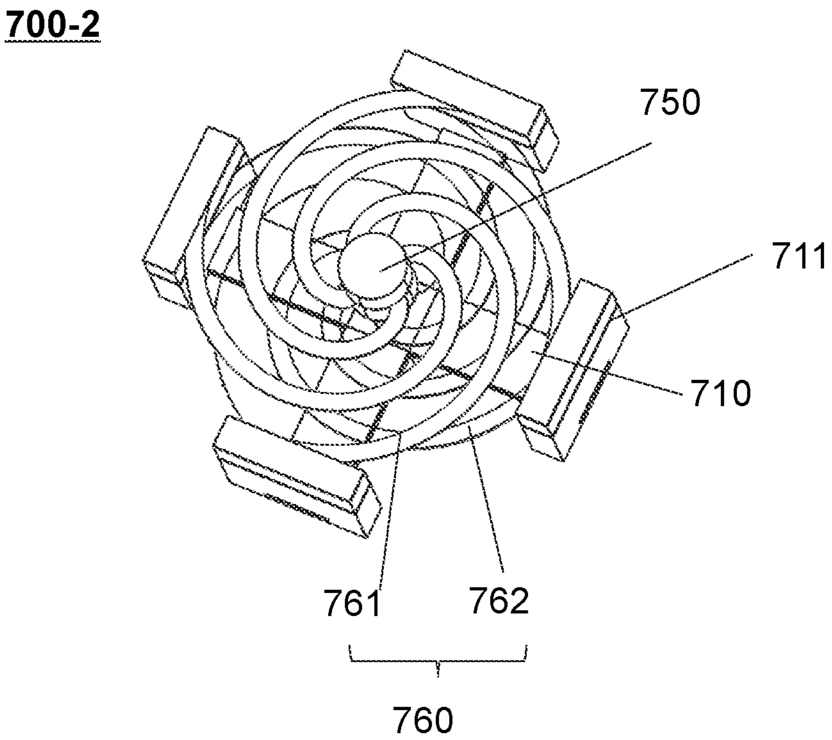
FIG. 7B is a structural diagram illustrating an exemplary elastic element according to some embodiments of the present disclosure.

FIG. 7B is a structural diagram illustrating an exemplary elastic element according to some embodiments of the present disclosure. The double-layer helical structure of the elastic element 730 shown in FIG. 7A may also be applied to an acoustic output device 700-2 shown in FIG. 7B. A structure of the elastic element in FIG. 7B may be substantially the same as the structure of the elastic element in FIG. 7A, except for a different arrangement of the elastic elements.

Referring to FIG. 7B, in some embodiments, an elastic element 760 may include a first helical structure 761 and a second helical structure 762 disposed up and down along a thickness direction of the mass element 750. The helical directions of the first helical structure 761 and the second helical structure 762 may be opposite.

In some embodiments, centers of the first helical structure 761 and the second helical structure 762 may be rigidly connected to each other. The first helical structure 761 and the second helical structure 762 may be connected to the mass element 750 through the rigidly connected centers. For example, the center of the first helical structure 761 and the center of the second helical structure 762 may be rigidly connected through a connection piece (not shown). The center of the rigid connection may be further connected to the mass element 750 through the connection piece. Outer edges of the first helical structure 761 and the second helical structure 762 may be connected to the piezoelectric element 710. In some embodiments, the outer edges of the first helical structure 761 and the second helical structure 762 may be rigidly connected to each other. For example, the outer edges of the first helical structure 761 and the second helical structure 762 may be rigidly connected to each other through the connection piece 711. An outer edge of the rigid connection may be further connected to the piezoelectric element 710 through the connection piece 711.

Figure 7C:
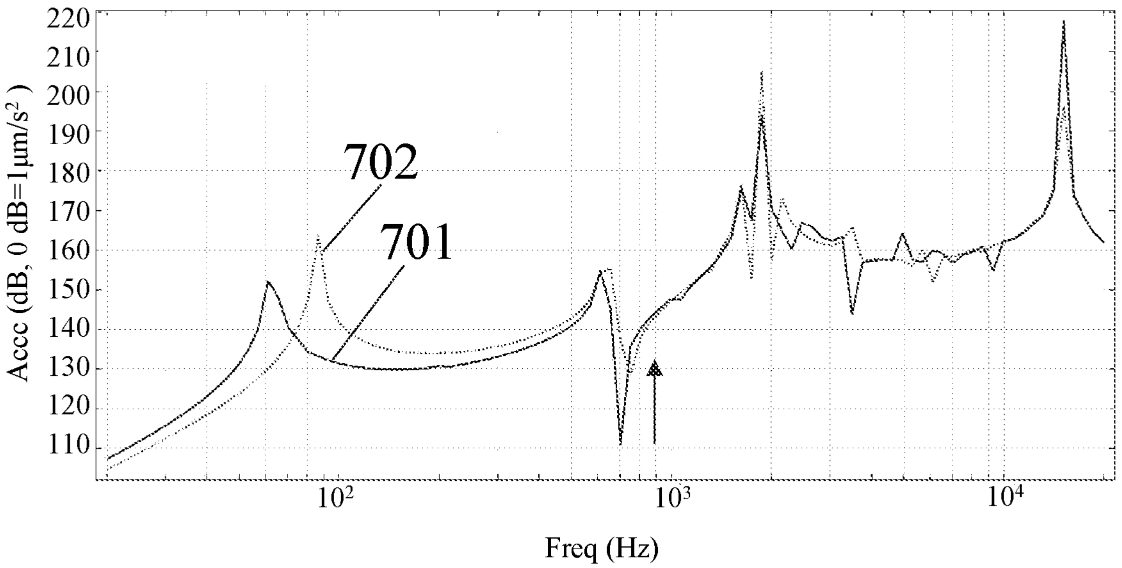
FIG. 7C is a graph illustrating frequency response curves of an acoustic output device according to some embodiments of the present disclosure.

In some embodiments, when the elastic element is the helical structure, the acoustic output device may have different vibration performances when the helical structure has different a count of layers. In some embodiments, an opposite symmetry of the double-layer helical structure may be higher than an opposite symmetry of the single-layer helical structure. In such cases, the vibration performance of the acoustic output device with the elastic element with the double-layer helical structure may be better than the vibration performance of the acoustic output device with the elastic element with the single-layer helical structure. FIG. 7C is a graph illustrating frequency response curves of an acoustic output device according to some embodiments of the present disclosure. A curve 701 denotes the frequency response curve of the acoustic output device with the elastic element with a single-layer helical structure, and a curve 702 denotes the frequency response curve of the acoustic output device with the elastic element with a double-layer helical structure. According to the curve 701 and the curve 702, compared with the elastic element with the single-layer helical structure, a peak value of a resonance valley in the frequency response curve 702 of the acoustic output device when the elastic element is with a double-layer helical structure may be significantly improved.

Figure 8A:
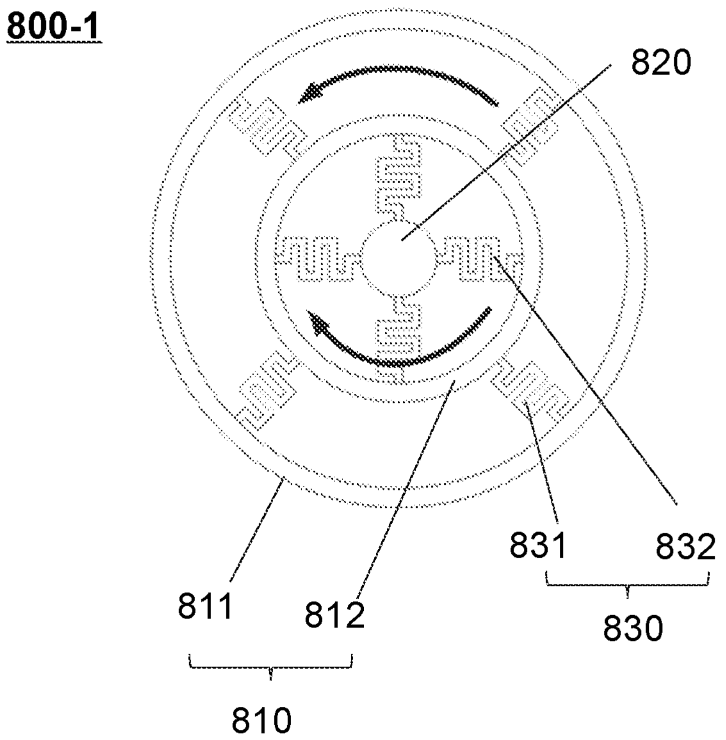
FIG. 8A is a structural diagram illustrating an exemplary elastic element according to some embodiments of the present disclosure.

FIG. 8A is a structural diagram illustrating an exemplary elastic element according to some embodiments of the present disclosure. Referring to FIG. 8A, an acoustic output device 800-1 may include a piezoelectric element 810, a mass element 820, and an elastic element 830. The piezoelectric element 810 may include a first piezoelectric element 811 and a second piezoelectric element 812, and the second piezoelectric element 812 may be located inside the first piezoelectric element 811. The mass element 820 may be located inside the second piezoelectric element 812.

In some embodiments, the elastic element 830 may include an inner ring elastic element 832 and an outer ring elastic element 831. In some embodiments, a curl of the shear stress provided by the inner ring elastic element 832 to the mass element 820 may be opposite to a curl of the shear stress provided by the outer ring elastic element 831 to the mass element 820, such that the elastic element 830 as a whole may provide shear stresses that cancel each other to the mass element 820. In some embodiments, a shape of the inner ring elastic element 832 and the outer ring elastic element 831 may include an S-shape, and a first curl corresponding to the shear stress provided by the S-shaped bar structure of the inner ring elastic element 832 to the mass element 820 may be opposite to a second curl corresponding to the shear stress provided by the S-shaped bar structure of the outer ring elastic element 831 to the mass element 820. The inner ring elastic element 832 may provide the shear stress of the first curl to the mass element 820, and the outer ring elastic element 831 may provide the shear stress of the second curl to the quality element 820. As the first curl is opposite to the second curl, the elastic element 830 as a whole may provide shear stresses that cancel each other to the mass element 820.

In some embodiments, when the curl of the shear stress provided by the inner ring elastic element 832 to the mass element 820 is opposite to the curl of the shear stress provided by the outer ring elastic element 831 to the mass element 820, during the vibration of the acoustic output device 800-1, a rotation mode generated by the inner elastic element 832 and a rotation mode generated by the outer elastic element 831 may be opposite. In such cases, the rotation mode generated by the inner elastic element 832 and the rotation mode generated by the outer elastic element 831 may cancel (or weaken) each other, which may reduce the rotation mode of the acoustic output device 800-1 during the vibration.

Figure 8B:
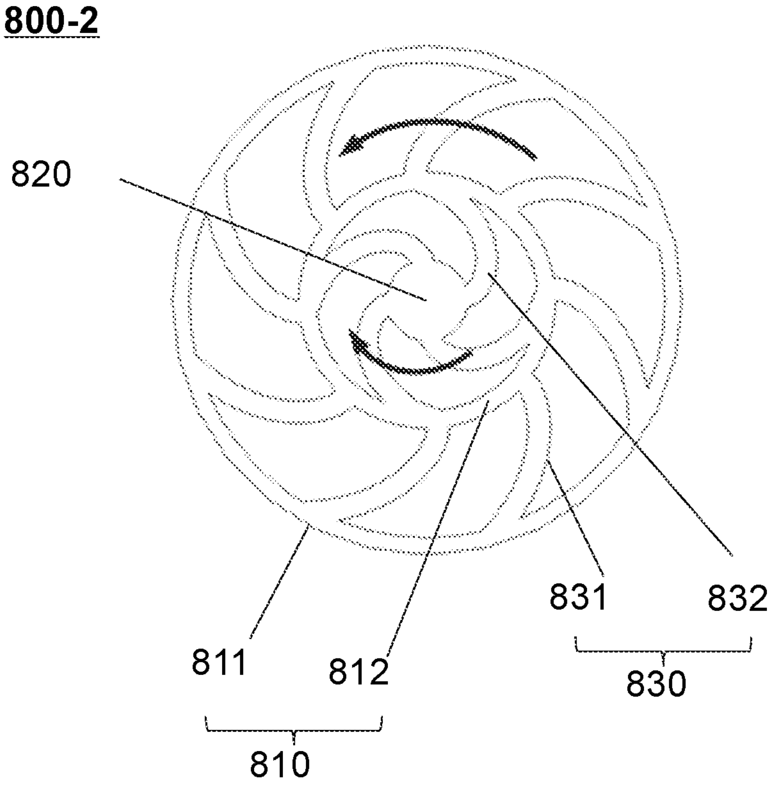
FIG. 8B is a structural diagram illustrating an exemplary elastic element according to some embodiments of the present disclosure.

FIG. 8B is a structural diagram illustrating an exemplary elastic element according to some embodiments of the present disclosure. A structure of the elastic element shown in FIG. 8B may be substantially the same as that shown in FIG. 8A, the difference lies in shapes of the elastic elements. The shape of the elastic element 830 of an acoustic output device 800-2 may be an arc. A first curl of the shear stress provided by the arc of the inner ring elastic element 832 may be opposite to a second curl of the shear stress provided by the arc of the outer ring elastic element 831.

In some embodiments, when the elastic element includes the inner ring elastic element and the outer ring elastic element, the shape of the inner/outer ring elastic element may not be limited to the S-shape and the arc shape, but may also be other shapes, for example, a broken line or a spline, etc.

More description regarding the elastic element including the inner ring elastic element and the outer ring elastic element may be found in FIGS. 12-18 and relevant descriptions thereof in the present disclosure.

Figure 9:
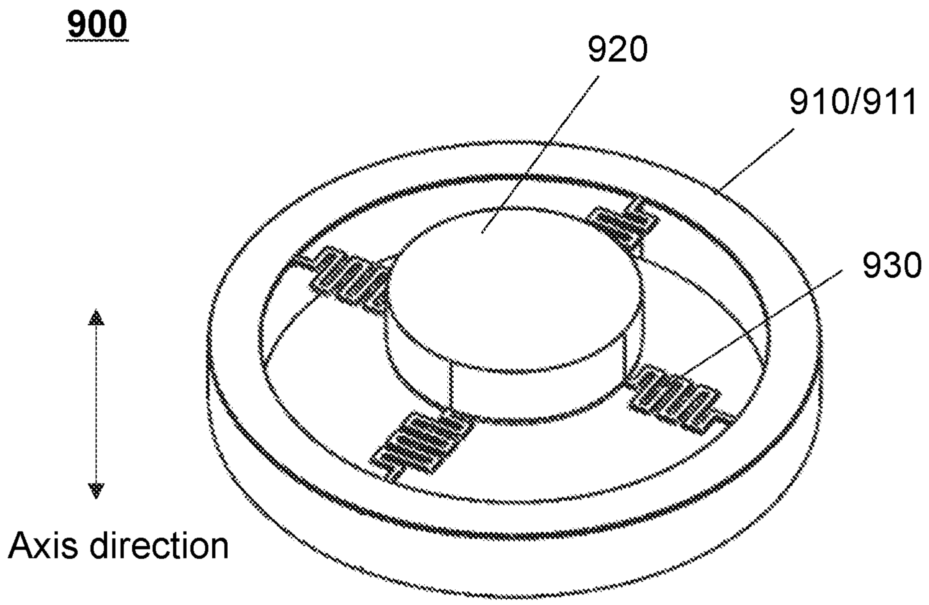
FIG. 9 is a structural diagram illustrating an exemplary acoustic output device according to some embodiments of the present disclosure.

FIG. 9 is a structural diagram illustrating an exemplary acoustic output device according to some embodiments of the present disclosure. As shown in FIG. 9, an acoustic output device 900 may include one or more piezoelectric elements 910, a mass element 920, and one or more elastic elements 930. At least one of the one or more elastic elements 930 may be used to connect the mass element 920 and the piezoelectric element 910.

In some embodiments, the one or more piezoelectric elements 910 may include a first piezoelectric element 911. The first piezoelectric element 911 may be an annular structure. An axis direction of the annular structure may be parallel to a vibration direction of the mass element 920. In some embodiments, one end of the first piezoelectric element 911 along the axis direction may be fixed (also referred to as a fixed end). The mass element 920 may be connected to other positions on the first piezoelectric element 911 except the end through the elastic element 930. In the embodiments of the present disclosure, one end of the piezoelectric element (such as the first piezoelectric element, the second piezoelectric element, etc.) refers to all regions with a certain thickness (e.g., 0.1%, 5%, or any thickness in the range of 0.1%-30% of a total thickness of the annular structure) starting from one annular end face of the annular structure of the piezoelectric element along an axis direction of the annular structure. For example, one end of the first piezoelectric element 911 along the axis direction being fixed may be that one of the annular end faces of the first piezoelectric element 911 is fixed. As another example, one end of the first piezoelectric element 911 along the axis direction being fixed may also be that a surface and/or an outer surface of the annular structure of a certain thickness area near one of the annular end faces of the first piezoelectric element 911 are fixed. In some embodiments, the elastic element 930 may be connected to another annular end face opposite to the annular end face of the fixed end. In some embodiments, the elastic element 930 may be connected to the inner surface of the annular structure, and a connection position on the inner surface may not be in a region of the fixed end.

In some embodiments, at least a portion of the mass element may be disposed inside the piezoelectric element. For example, a projection of a connection point between the mass element and the elastic element along the axis direction of the piezoelectric element may be located within the projection of the piezoelectric element along the axis direction. For example, as shown in FIG. 9, the projections of the piezoelectric element 910, the elastic element 930, and the mass element 920 along the axis direction of the piezoelectric element 910 may be disposed sequentially from outside to inside. In some embodiments, when the mass element 920 is located inside the first piezoelectric element 911, a shape of the mass element 920 may be a column (as shown in FIG. 9), a ring, etc.

In some embodiments, the elastic element 930 connecting the mass element 920 and the first piezoelectric element 911 may include a plurality of bar structures distributed along a circumference of the annular structure. In some embodiments, one end of the elastic element 930 may be connected to any surface of the mass element 920 along the axis direction (e.g., the surface close to the piezoelectric element 910). In some embodiments, one end of the elastic element 930 may be connected to a peripheral surface of the mass element 920. In some embodiments, the other end of the elastic element 930 may be connected to any surface of the non-fixed end of the piezoelectric element 910. For example, in some embodiments, the other end of the elastic element 930 may be connected to the annular end face of the piezoelectric element 910 close to the mass element 920. As another example, in some embodiments, the other end of the elastic element 930 may be connected to a peripheral inner surface of the piezoelectric element 910. The connection positions of the elastic element 930 and the mass element 920 and/or the piezoelectric element 910 may be disposed according to a structural feasibility of the acoustic output device 900.

In some embodiments, the elastic element 930 may at least include two portions. The at least two portions may provide shear stresses of opposite curls to the mass element 920. The shear stresses of opposite curls may cancel each other such that the elastic element 930 may provide zero or close to zero shear stress to mass element 920. For example, each of the plurality of bar structures may include one or more bending regions. The curls of shear stresses provided by adjacent bending regions of the one or more bending regions to the mass element 920 may be opposite, such that the shear stress provided by each bar structure to the mass element 920 as a whole may be zero or close to zero. In some embodiments, the structure of the elastic element 930 may be the same as or similar to the structure of the elastic element described in FIGS. 2-5. More description regarding the structure of the elastic element may be found in FIGS. 2-5 and relevant descriptions thereof.

In some embodiments, a resonance of the mass element 920 and the elastic element 930 may generate a first resonance peak, and a resonance of the first piezoelectric element 911 may generate a second resonance peak. The position of the first resonance peak, that is, a first resonance frequency corresponding to the first resonance peak may be determined by a mass of the mass element 920 and an elastic coefficient of the elastic element 930. The position of the second resonance peak, that is, a second resonance frequency corresponding to the second resonance peak may be determined by a structural parameter (e.g., a size) of the piezoelectric element 910.

Figure 10:
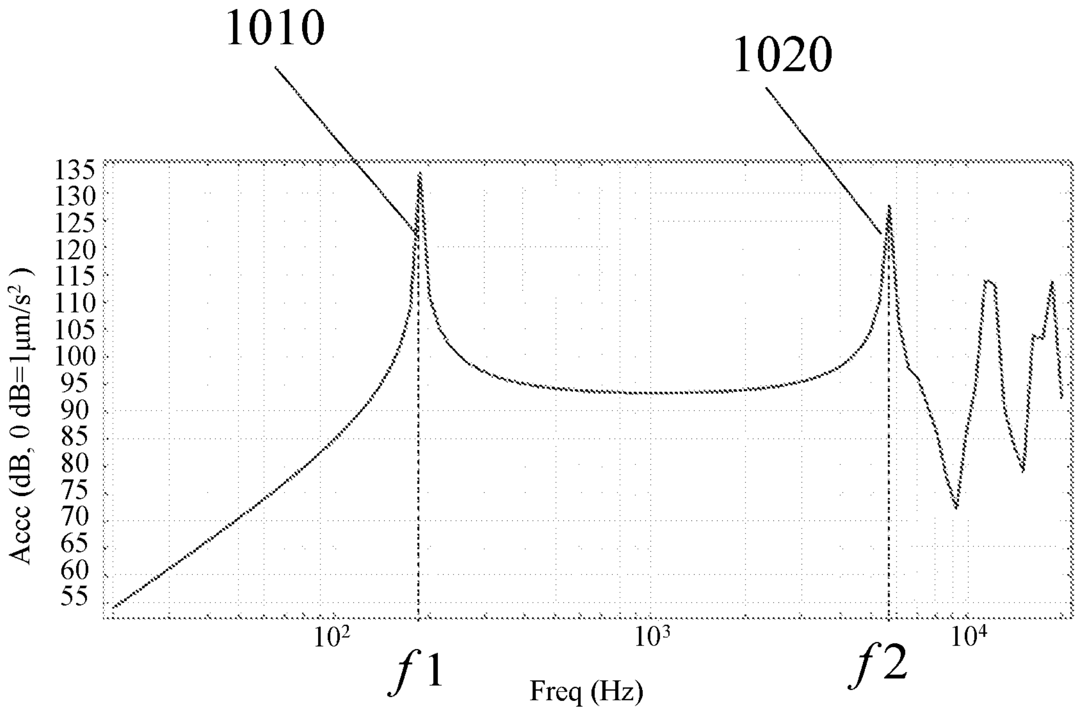
FIG. 10 is a graph illustrating a frequency response curve of an acoustic output device according to some embodiments of the present disclosure.

FIG. 10 is a graph illustrating a frequency response curve of an acoustic output device according to some embodiments of the present disclosure. As shown in FIG. 10, an abscissa denotes the resonance frequency of the acoustic output device in Hz, and an ordinate denotes an acceleration output intensity of the acoustic output device in dB. In some embodiments, referring to FIG. 10, the acoustic output device (e.g., the acoustic output device 900) may generate at least two resonant peaks in the frequency range of the audible domain (such as 20 Hz-20 KHz), a first resonant peak 1010 may be generated by the resonance of the mass element 920 and the elastic element 930, and a second resonance peak 1020 may be generated by the resonance of the piezoelectric element 910. In some embodiments, a frequency f1 of the first resonance peak 1010 of the acoustic output device 900 may be in a range of 50 Hz-9000 Hz. In some embodiments, the frequency f1 of the first resonance peak 1010 of the acoustic output device 900 may be in a range of 50 Hz-500 Hz. In some embodiments, the frequency f1 of the first resonance peak 1010 of the acoustic output device 900 may be in a range of 50 Hz-300 Hz. In some embodiments, the frequency f1 of the first resonance peak 1010 of the acoustic output device 900 may be in a range of 50 Hz-900 Hz. In some embodiments, the frequency f1 of the first resonance peak 1010 of the acoustic output device 900 may be in a range of 100 Hz-900 Hz. In some embodiments, a frequency f2 of the second resonance peak 1020 of the acoustic output device 900 may be in a range of 1000 Hz-20000 Hz. In some embodiments, the frequency f2 of the second resonance peak 1020 of the acoustic output device 900 may be in a range of 2000 Hz-10000 Hz. In some embodiments, the frequency f2 of the second resonance peak 1020 of the acoustic output device 900 may be in a range of 2000 Hz-8000 Hz. In some embodiments, the frequency f2 of the second resonance peak 1020 of the acoustic output device 900 may be in a range of 2000 Hz-7000 Hz. In some embodiments, the frequency f2 of the second resonance peak 1020 of the acoustic output device 900 may be in a range of 3000 Hz-7000 Hz. In some embodiments, the frequency f2 of the second resonance peak 1020 of the acoustic output device 900 may be in a range of 4000 Hz-7000 Hz. In some embodiments, the frequency f2 of the second resonance peak 1020 of the acoustic output device 900 may be in a range of 5000 Hz-7000 Hz. The frequency response curve between the first resonance peak 1010 and the second resonance peak 1020 may be relatively flat, and the acoustic output device 900 may have a higher output response in the frequency range between the first resonant frequency f1 and the second resonant frequency f2. When the acoustic output device 900 may output sound with better sound quality when applied to an acoustic output device.

Figure 11A:
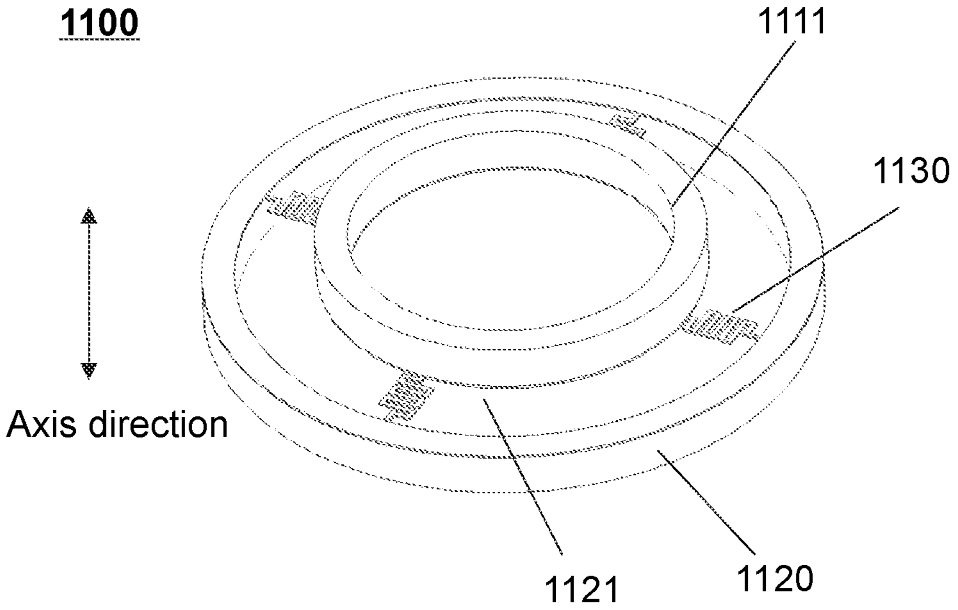
FIG. 11A is a structural diagram illustrating an exemplary acoustic output device according to some embodiments of the present disclosure.

In some embodiments, at least a portion of the mass element may be located outside the piezoelectric element. For example, at least a portion of the mass element may be an annular structure. The annular structure of the mass element may be connected to the piezoelectric element through the elastic element. A projection of the annular structure of the mass element along an axis direction of the annular structure may be located outside a projection of the piezoelectric element along the axis direction. FIG. 11A is a structural diagram illustrating an exemplary acoustic output device according to some embodiments of the present disclosure. As shown in FIG. 11A, a mass element 1120 may be located outside a first piezoelectric element 1111. A projection of the mass element 1120 along an axis direction of the first piezoelectric element 1111 may be located outside a projection of the first piezoelectric element 1111 along the axis direction. The mass element 1120 may be connected to the first piezoelectric element 1111 through an elastic element 1130. The projections of the first piezoelectric element 1111, the elastic element 1130, and the mass element 1120 along the axis direction of the first piezoelectric element 1111 may be disposed sequentially from inside to outside. In some embodiments, when the mass element 1120 is located outside the first piezoelectric element 1111, a shape of the mass element 1120 may be a ring.

In some embodiments, when the mass element 1120 is located outside the first piezoelectric element 1111, a side of the mass element 1120 away from the first piezoelectric element 1111 along the axis direction of the first piezoelectric element 1111 may be provided with a cover plate 1121. The cover plate 1121 may seal the side of the mass element 1120 away from the first piezoelectric element 1111 along the axis direction of the first piezoelectric element 1111. For example, the cover plate 1121 may be a circular structure. A peripheral side of the cover plate 1121 may be aligned with and tightly connected to the side of the mass element 1120 away from the first piezoelectric element 1111 along the axis direction of the first piezoelectric element 1111. By disposing the cover plate 1121 on the side of the mass element 1120 away from the first piezoelectric element 1111 along the axis direction of the first piezoelectric element 1111, the cover plate 1121 may be configured as a vibration plate for transmitting a vibration signal. The cover plate 1121 may also be configured to connect the mass element 1120 with other structures of the acoustic output device 1100, such as a diaphragm.

Figure 11B:
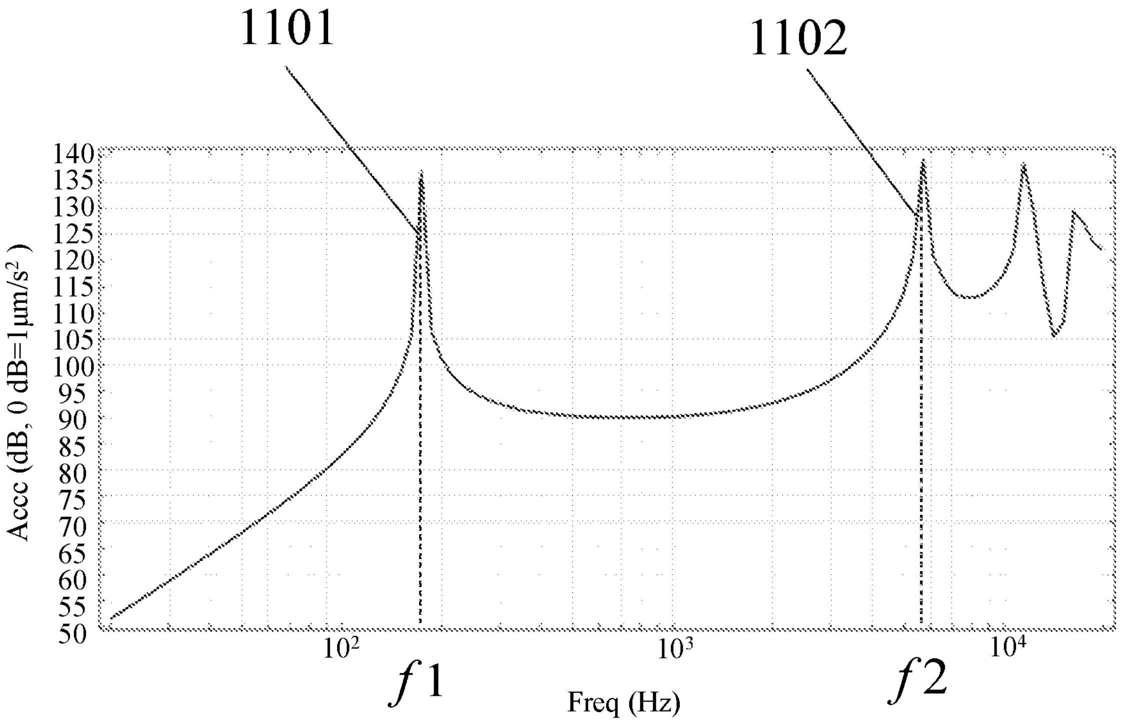
FIG. 11B is a graph illustrating a frequency response curve of an acoustic output device according to some embodiments of the present disclosure.

FIG. 11B is a graph illustrating a frequency response curve of an acoustic output device according to some embodiments of the present disclosure. A frequency response curve of the acoustic output device 1100 including the mass element 1120 located outside the first piezoelectric element 1111 may be as shown in FIG. 11B. In some embodiments, a frequency f1 (also referred to as a first resonance frequency) of a first resonance peak 1101 of the acoustic output device 1100 may be in a range of 50 Hz-4000 Hz. In some embodiments, the frequency f1 of the first resonance peak 1101 of the acoustic output device 1100 may be in a range of 50 Hz-500 Hz. In some embodiments, the frequency f1 of the first resonance peak 1101 of the acoustic output device 1100 may be in a range of 50 Hz-300 Hz. In some embodiments, the frequency f1 of the first resonance peak 1101 of the acoustic output device 1100 may be in a range of 50 Hz-200 Hz. In some embodiments, the frequency f1 of the first resonance peak 1101 of the acoustic output device 1100 may be in a range of 100 Hz-200 Hz. In some embodiments, a frequency f2 (also referred to as a second resonance frequency) of a second resonance peak 1102 of the acoustic output device 1100 may be in a range of 1000 Hz-40000 Hz. In some embodiments, the frequency f2 of the second resonance peak 1102 of the acoustic output device 1100 may be in a range of 4000 Hz-10000 Hz. In some embodiments, the frequency f2 of the second resonance peak 1102 of the acoustic output device 1100 may be in a range of 4000 Hz-8000 Hz. In some embodiments, the frequency f2 of the second resonance peak 1102 of the acoustic output device 1100 may be in a range of 4000 Hz-7000 Hz. In some embodiments, the frequency f2 of the second resonance peak 1102 of the acoustic output device 1100 may be in a range of 4000 Hz-6000 Hz.

Figure 12:
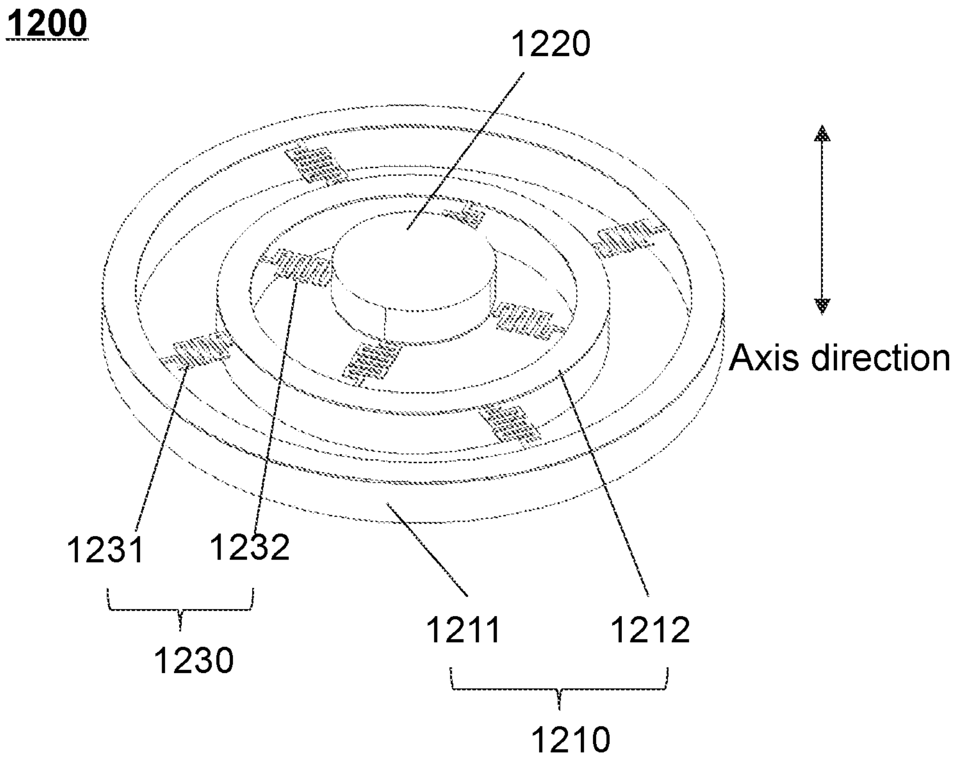
FIG. 12 is a structural diagram illustrating an exemplary acoustic output device according to some embodiments of the present disclosure.

FIG. 12 is a structural diagram illustrating an exemplary acoustic output device according to some embodiments of the present disclosure. Referring to FIG. 12, an acoustic output device 1200 may include one or more piezoelectric elements 1210, a mass element 1220, and one or more elastic elements 1230. At least one of the one or more elastic elements 1230 may be configured to connect the mass element 1220 and the piezoelectric element 1210.

In some embodiments, the one or more piezoelectric elements 1210 may include a first piezoelectric element 1211 and a second piezoelectric element 1212. The first piezoelectric element 1211 may include a first annular structure, and the second piezoelectric element 1212 may include a second annular structure. The second piezoelectric element 1212 may be disposed inside the first annular structure. In some embodiments, one end of the first piezoelectric element 1211 along an axis direction (e.g., an end away from the mass element 1220) may be fixed. The second piezoelectric element 1212 may be connected to the first piezoelectric element 1211 at another position except the fixed end through at least one of the one or more elastic elements 1230. The mass element 1220 may be connected to the second piezoelectric element 1212 through at least another one of the one or more elastic elements 1230. In some embodiments, at least a portion of the mass element 1220 may be located inside the second piezoelectric element 1212. For example, a projection of a connection point between the mass element 1220 and the elastic element 1230 (e.g., an inner ring elastic element 1232) along an axis direction may be located within the projection along the axis direction of the second annular structure along the axis direction.

In some embodiments, the elastic element 1230 may include an outer ring elastic element 1231 and an inner ring elastic element 1232. The outer ring elastic element 1231 may be located between the first piezoelectric element 1211 and the second piezoelectric element 1212. The first piezoelectric element 1211 may be connected to the second piezoelectric element 1212 through the outer ring elastic element 1231. The inner ring elastic element 1232 may be located between the second piezoelectric element 1212 and the mass element 1220. The second piezoelectric element 1212 may be connected to the mass element 1220 through the inner ring elastic element 1232.

In some embodiments, shear stresses provided by the inner ring elastic element 1232 and the outer ring elastic element 1231 to the mass element 1220 may have opposite curls. In some embodiments, the curls of the shear stresses provided by the plurality of bar structures in the inner ring elastic element 1232 and the plurality of bar structures in the outer ring elastic element 1231 to the mass element 1220 may be correspondingly opposite. For example, the inner ring elastic element 1232 may provide a shear stress of a first curl to the mass element 1220, and the outer ring elastic element 1231 may provide a shear stress of a second curl to the mass element 1220. In some embodiments, as shown in FIG. 12, the inner ring elastic element 1232 and the outer ring elastic element 1231 may include a plurality of bar structures. Each bar structure may include one or more bending regions. Bending directions of the bar structures of the inner ring elastic element 1232 and the outer ring elastic element 1231 may be opposite to each other such that the first curl may be opposite to the second curl, and then the inner ring elastic element 1232 and the outer ring elastic element 1231 may provide shear stresses of opposite curls to the mass element 1220. In some embodiments, the shapes of the inner ring elastic element 1232 and the outer ring elastic element 1231 are not limited to the S-shape shown in FIG. 12, and may include other shapes, such as a broken line, a spline, an arc, and a straight line, etc. In some embodiments, the inner ring elastic element 1232 and the outer ring elastic element 1231 may include a helical structure. Helical directions of the helical structures in the inner ring elastic element 1232 and the outer ring elastic element 1231 may be opposite to each other such that the first curl may be made opposite to the second curl, and then the inner ring elastic element 1232 and the outer ring elastic element 1231 may provide shear stresses of opposite curls to the mass element 1220. In such cases, the shear stresses provided by the inner ring elastic element 1232 and the outer ring elastic element 1231 to the mass element 1220 may cancel each other such that the shear stress provided by the elastic element 1230 to the mass element 1220 may be zero or close to zero, thereby preventing or reducing the rotation of the mass element 1220.

In some embodiments, the second piezoelectric element 1212 may be disposed in the acoustic output device 1200 such that the second piezoelectric element 1212 and the mass element 1220 (and the elastic element connecting the second piezoelectric element 1212 and the mass element 1220) may form an integral mass. When the integral mass resonates with the elastic element connecting the integral mass and the first piezoelectric element 1211, since the integral mass is greater than the mass of the mass element, the first resonant peak of the acoustic output device 1200 may move to a low frequency. And when the acoustic output device 1200 vibrates, the resonance of the double annular structure formed by the first annular structure and the second annular structure may generate a third resonance peak located between the first resonance peak and the second resonance peak. The third resonance peak may be an additional resonance peak between the first resonance peak and the second resonance peak in the frequency resonance curve of the acoustic output device 1200. In some embodiments, a third resonance frequency corresponding to the third resonance peak may be between the first resonance frequency corresponding to the first resonance peak and the second resonance frequency corresponding to the second resonance peak. In some embodiments, the first resonance peak of the acoustic output device 1200 with the double annular structure may be in a range of 50 Hz-2000 Hz. In some embodiments, the first resonance peak of the acoustic output device 1200 with the double annular structure may be in a range of 50 Hz-1000 Hz. In some embodiments, the first resonance peak of the acoustic output device 1200 with the double annular structure may be in a range of 50 Hz-500 Hz. In some embodiments, the first resonance peak of the acoustic output device 1200 with the double annular structure may be in a range of 50 Hz-300 Hz. In some embodiments, the first resonance peak of the acoustic output device 1200 with the double annular structure may be in a range of 50 Hz-200 Hz. In some embodiments, the first resonance peak of the acoustic output device 1200 with the double annular structure may be in a range of 50 Hz-100 Hz.

Figure 13:
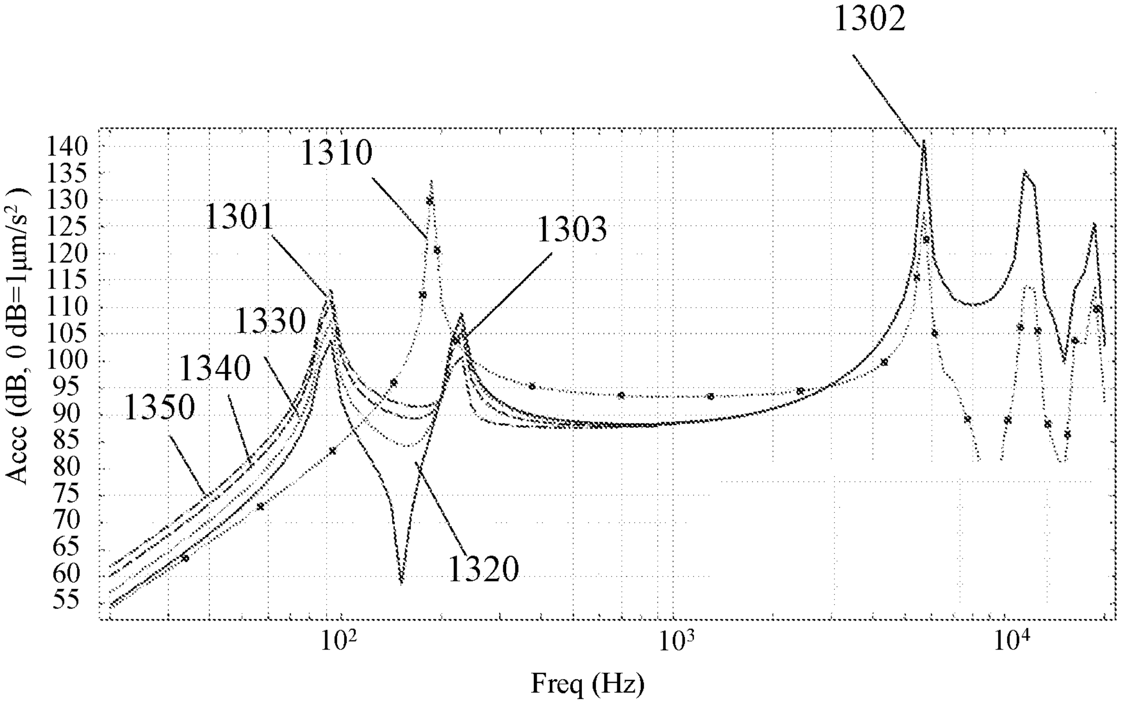
FIG. 13 is a graph illustrating frequency response curves of an acoustic output device according to some embodiments of the present disclosure.

FIG. 13 is a graph illustrating frequency response curves of an acoustic output device according to some embodiments of the present disclosure. A curve 1310 denotes the frequency response curve of the acoustic output device (e.g., the acoustic output device 900) with only a first piezoelectric element, and curves 1320, 1330, 1340, and 1350 denote the frequency response curves of the acoustic output device (e.g., the acoustic output device 1200) with the first piezoelectric element and a second piezoelectric element, and an electrical signal received by the first piezoelectric element and the second piezoelectric element have different phase differences. According to curve 1310 and curves 1320-1350, when the acoustic output device is disposed with the second piezoelectric element, not only the first resonance peak 1301 and the second resonance peak 1302 may be formed in the frequency response curve 1320 of the acoustic output device, but also an additional resonance peak, that is, the third resonance peak 1303 may be formed.

Figure 14:
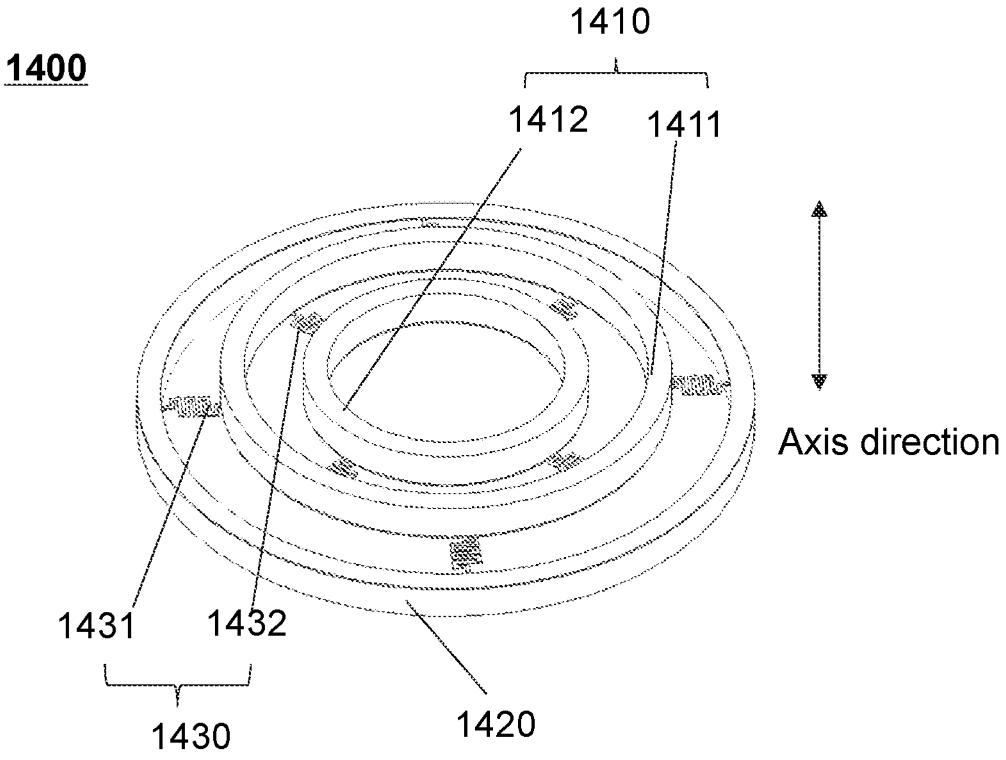
FIG. 14 is a structural diagram illustrating an exemplary acoustic output device according to some embodiments of the present disclosure.

In some embodiments, when the acoustic output device includes the first piezoelectric element and the second piezoelectric element, at least a portion of the mass element may be located outside the first piezoelectric element. FIG. 14 is a structural diagram illustrating an exemplary acoustic output device according to some embodiments of the present disclosure. As shown in FIG. 14, one or more piezoelectric elements 1410 may include a first piezoelectric element 1411 and a second piezoelectric element 1412. The first piezoelectric element 1411 may include a first annular structure, and the second piezoelectric element 1412 may include a second annular structure. The second piezoelectric element 1412 may be disposed inside the first annular structure. In some embodiments, one end of the second piezoelectric element 1412 along an axis direction of the annular structure may be fixed. The first piezoelectric element 1411 may be connected to another position except the fixed end of the second piezoelectric element 1412 through at least one of the one or more elastic elements 1430 (e.g., an inner ring elastic element 1432). At least a portion of a mass element 1420 may be an annular structure, the annular structure of the mass element 1420 may be connected to a first annular structure through an outer ring elastic element 1431 of the elastic element 1430. A projection of the annular structure of the mass element 1420 along the axis direction may be located outside the projection of the first annular structure along the axis direction. In some embodiments, as shown in FIG. 14, the inner ring elastic element 1432 and the outer ring elastic element 1431 may include a plurality of bar structures. Each bar structure may include one or more bending regions. In some embodiments, shapes of the inner ring elastic element 1432 and the outer ring elastic element 1431 are not limited to the S-shape shown in FIG. 14, and may include other shapes, such as a broken line, a spline, an arc, and a straight line, etc. In some embodiments, the inner ring elastic element 1432 and the outer ring elastic element 1431 may include a helical structure. In some embodiments, the inner ring elastic element 1432 may provide a shear stress of a first curl to the mass element 1420, and the outer ring elastic element 1431 may provide a shear stress of a second curl to the mass element 1420. Structures of the inner ring elastic element 1432 and the outer ring elastic element 1431 may be configured (e.g., bending directions of the bar structures are opposite to each other, helical directions of the helical structures are opposite to each other, etc.) such that the first curl and the second curl may be opposite to each other, and then the inner ring elastic element 1432 and the outer ring elastic element 1431 may provide shear stresses of opposite curls to the mass element 1420. In such cases, the shear stress provided by the elastic element 1430 to the mass element 1420 may be zero or close to zero, thereby preventing or reducing a rotation of the mass element 1420.

In some embodiments, the acoustic output device 1400 may include a first piezoelectric element 1411 and a second piezoelectric element 1412. When the mass element 1420 is located outside the first piezoelectric element 1411, a cover plate may be provided on a side of the mass element 1420 away from the first piezoelectric element 1411 along the axial direction of the first piezoelectric element 1411. In some embodiments, a closed side of the mass element 1420 (that is, the side of the mass element 1420 disposed with the cover plate) may extend away from the unclosed side. A projection of a closed surface of the mass element 1420 along the axis direction may have various shapes, for example, a circle, a square, etc. An unclosed end of the mass element 1420 may be connected to the piezoelectric element 1410 (e.g., the first piezoelectric element 1411), and a shape of the projection of an end face of the unclosed end of the mass element 1420 along the axis direction may be a ring.

In some embodiments, the first piezoelectric element 1411 and the mass element 1420 (and the elastic element connecting the first piezoelectric element 1411 and the mass element 1420) may form an integral mass. When the integral mass resonates with the elastic element connecting the integral mass and the second piezoelectric element 1412, the first resonance peak of the acoustic output device 1400 may be caused to move to a low frequency, and the resonance of a double-annular structure of the acoustic output device 1400 may generate a third resonance peak between the first resonance peak and the second resonance peak.

Figure 15:
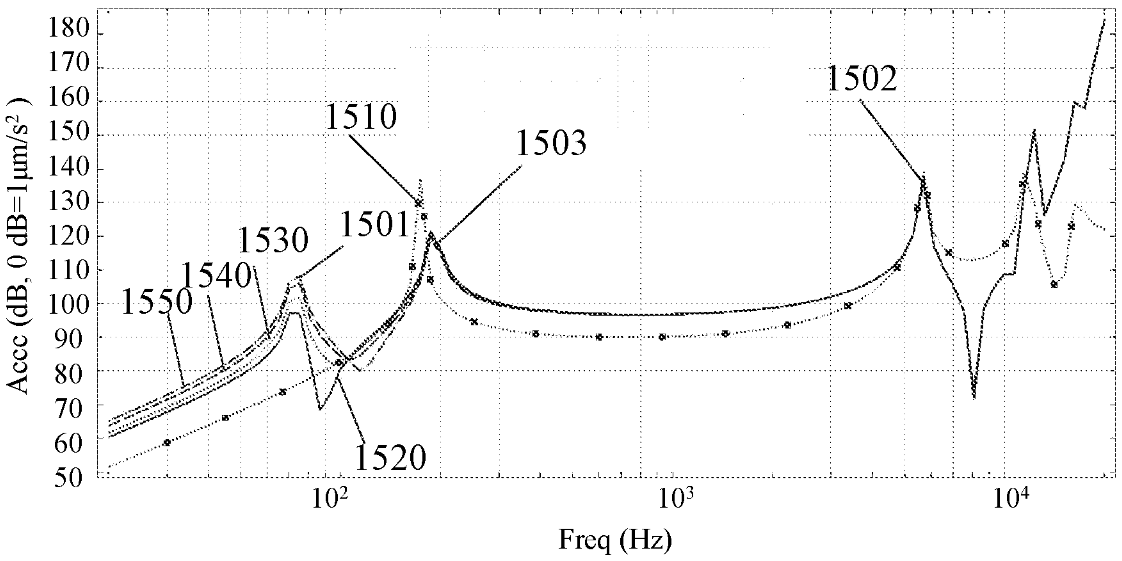
FIG. 15 is a graph illustrating frequency response curves of an acoustic output device according to some embodiments of the present disclosure.

FIG. 15 is a graph illustrating frequency response curves of an acoustic output device according to some embodiments of the present disclosure. A curve 1510 denotes the frequency response curve of the acoustic output device (e.g., the acoustic output device 900) with a first piezoelectric element, and curves 1520, 1530, 1540, and 1550 denote the frequency response curves of the acoustic output device (e.g., the acoustic output device 1400) with the first piezoelectric element and a second piezoelectric element, and an electrical signal received by the first piezoelectric element and the second piezoelectric element have different phase differences. According to the curve 1510 and the curves 1520-1550, when the acoustic output device is disposed with the second piezoelectric element, not only a first resonance peak 1501 and a second resonance peak 1502 may be formed in the frequency response curve 1520 of the acoustic output device, but also a third resonance peak 1501 may be formed.

Figure 16:
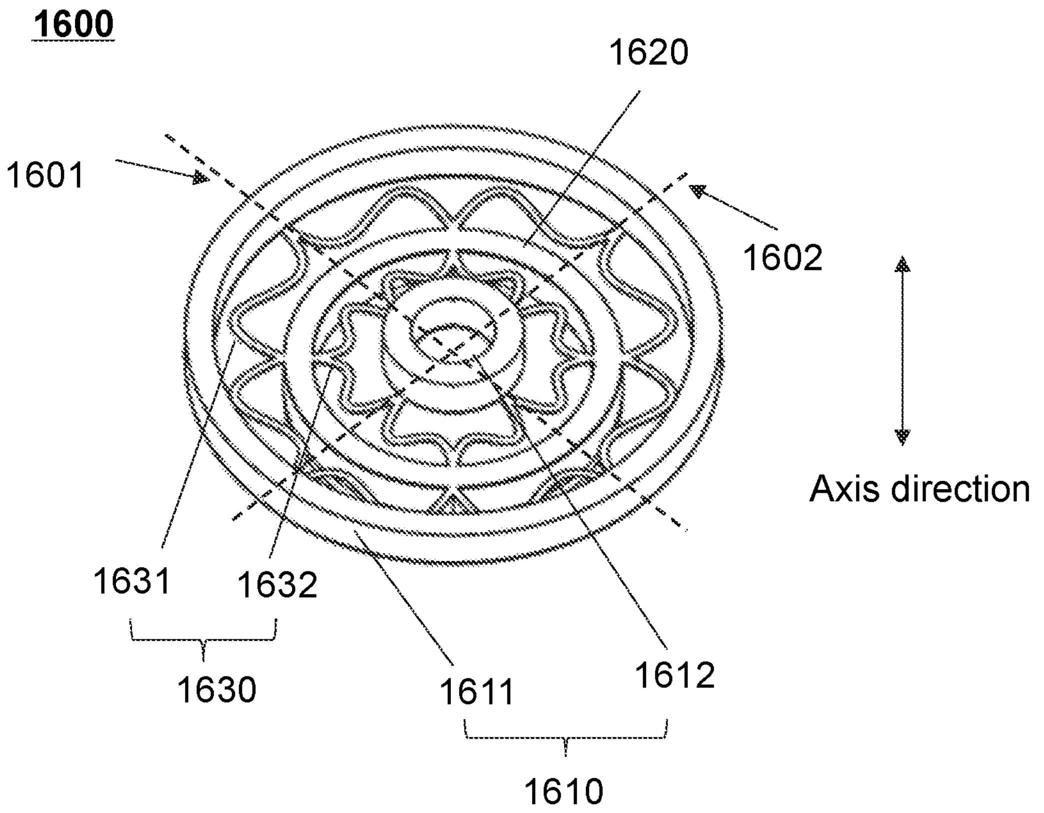
FIG. 16 is a structural diagram illustrating an exemplary acoustic output device according to some embodiments of the present disclosure.

In some embodiments, when the acoustic output device includes the first piezoelectric element and the second piezoelectric element, at least a portion of a mass element may be located between the first piezoelectric element and the second piezoelectric element. FIG. 16 is a structural diagram illustrating an exemplary acoustic output device according to some embodiments of the present disclosure. As shown in FIG. 16, in some embodiments, at least a portion of a mass element 1620 may be an annular structure. The annular structure of the mass element 1620 may be located between a first annular structure of a first piezoelectric element 1611 and a second annular structure of a second piezoelectric element 1612. A projection of the annular structure of the mass element 1620 along an axis direction may be located between the projections of the first annular structure and the second annular structure along the axis direction. The annular structure of the mass element 1620 may be connected to the first piezoelectric element 1611 through at least one of the one or more elastic elements 1630 (e.g., the outer ring elastic element 1631). The mass element 1620 may be connected to the second piezoelectric element 1612 through at least another one of the one or more elastic elements (e.g., the inner ring elastic element 1632). In some embodiments, the elastic element 1630 (e.g., the outer ring elastic element 1631 and/or the inner ring elastic element 1632) may have an S-shape. Bending directions of adjacent S-shaped elastic elements 1630 may be opposite such that the adjacent S-shaped elastic elements 1630 may provide shear stresses of opposite curls to the mass element 1620, which may prevent the mass element 1620 from generating a rotation tendency of rotating around the axis direction, thereby preventing the acoustic output device 1600 from generating a rotation mode. In some embodiments, a projection of the elastic element 1630 along the vibration direction of the mass element 1620 (i.e., the axis direction) may have at least one symmetry axis (e.g., a first symmetry axis 1601 and/or a second symmetry axis 1602 shown in FIG. 16) such that the curls corresponding to the shear stresses provided by the symmetrical S-shape along the symmetry axis may be different (e.g., opposite) and the S-shaped elastic elements 1630 on both sides of the symmetry axis may provide shear stresses of opposite curls to the mass element 1620. In such cases, the rotation tendency of the mass element 1620 to rotate around the axis direction may be avoided, thereby reducing the rotation mode of the acoustic output device 1600. In some embodiments, referring to FIG. 16, connection positions of adjacent S-shaped elastic elements 1630 on the mass element 1620 or the piezoelectric element 1610 (e.g., the first piezoelectric element 1611 and/or the second piezoelectric element 1612) may be the same. In some embodiments, the connection positions of the adjacent S-shaped elastic elements 1630 on the mass element 1620 or the piezoelectric element 1610 (e.g., the first piezoelectric element 1611 and/or the second piezoelectric element 1612) may be different. In some embodiments, the shapes of the inner ring elastic element 1632 and the outer ring elastic element 1631 are not limited to the S-shape shown in FIG. 16, and may include other shapes, such as a broken line, a spline, an arc, and a straight line, etc. In some embodiments, the inner ring elastic element 1632 and the outer ring elastic element 1631 may include a helical structure. Structures of the inner ring elastic element 1632 and the outer ring elastic element 1631 may be configured (e.g., bending directions of the bar structures are opposite to each other, helical directions of the helical structures are opposite to each other, etc.) such that the inner ring elastic element 1632 and the outer ring elastic element 1631 may provide shear stresses with opposite curls to the mass element 1620. In such cases, the shear stress provided by the elastic element 1630 to the mass element 1620 may be zero or close to zero, thereby preventing or reducing the rotation of the mass element 1620.

In some embodiments, the first piezoelectric element 1611 or the second piezoelectric element 1612 may have a fixed end along the axis direction. In some embodiments, when one end of the first piezoelectric element 1611 along the axis direction is fixed, two end faces of the second piezoelectric element 1612 along the axis direction may be free. The second piezoelectric element 1612 may be configured as a piezoelectric free ring. The first piezoelectric element 1611 may be configured as a piezoelectric fixed ring. Or when one end of the second piezoelectric element 1612 along the axis direction is fixed, two end faces of the first piezoelectric element 1611 along the axis direction may be free. The first piezoelectric element 1611 may be configured as a piezoelectric free ring, and the second piezoelectric element 1612 may be configured as a piezoelectric fixed ring. In some embodiments, when different piezoelectric elements in the at least one piezoelectric element 1610 have fixed ends along the axis direction, the acoustic output device 1600 may have different frequency response curves. An integral mass formed by the piezoelectric free ring and the mass element 1620 (and the elastic element connecting the piezoelectric free ring and the mass element 1620) may resonate with the elastic element connecting the integral mass and the piezoelectric fixed ring, which may cause a first resonance peak to move to a low frequency. And the piezoelectric free ring may be indirectly connected to the piezoelectric fixed ring (that is, through the outer ring elastic element 1631, the mass element 1620, and the inner ring elastic element 1632) such that when the acoustic output device 1600 vibrates, a resonance of the piezoelectric free ring and the piezoelectric fixed ring may generate a third resonance peak in the frequency response curve. A third resonance frequency corresponding to the third resonance peak may be between a first resonance frequency corresponding to the first resonance peak and a second resonance frequency corresponding to a second resonance peak. In some embodiments, a frequency range of the first resonant peak of the acoustic output device 1600 may be similar to the frequency range of the first resonant peak of the acoustic output device 1200, which is not repeated here.

Figure 17:
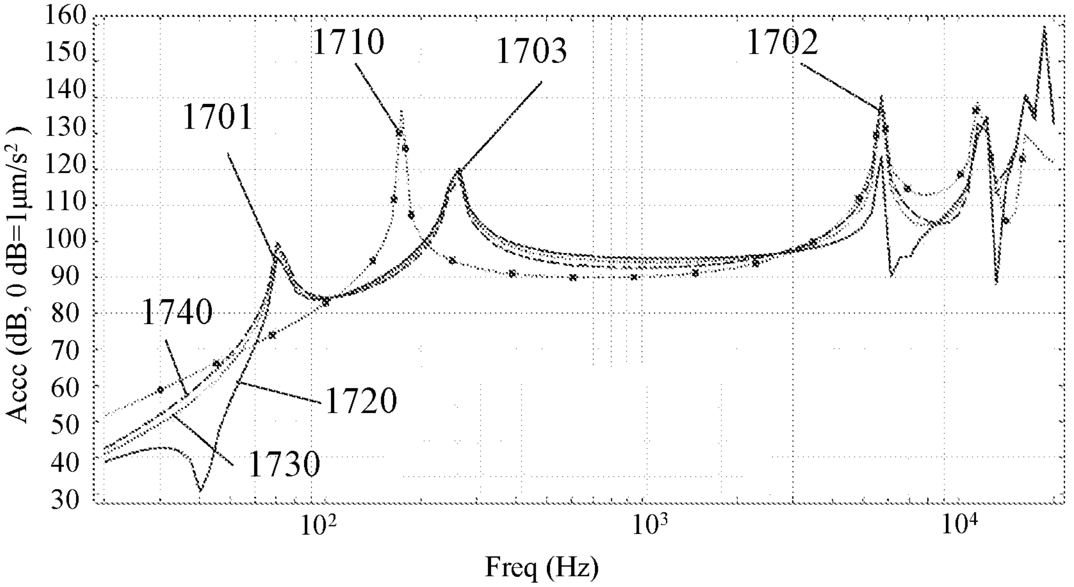
FIG. 17 is a graph illustrating frequency response curves of an acoustic output device according to some embodiments of the present disclosure.

FIG. 17 is a graph illustrating frequency response curves of an acoustic output device according to some embodiments of the present disclosure. The frequency response curves except a curve 1710 in FIG. 17 may be the frequency response curves of the acoustic output device (e.g., the acoustic output device 1600) whose first piezoelectric element (e.g., the first piezoelectric element 1611) has a fixed end along an axis direction. Referring to FIG. 17, the curve 1710 denotes the frequency response curve of the acoustic output device (e.g., the acoustic output device 900) with a first piezoelectric element, and curves 1720, 1730, and 1740 denote the frequency response curves of the acoustic output device with the first piezoelectric element and a second piezoelectric element, and an electrical signal received by the first piezoelectric element and the second piezoelectric element have different phase differences. According to the curve 1710 and the curves 1720-1740, when the acoustic output device is disposed with the first piezoelectric element and the second piezoelectric element, except the first resonate peak 1701 and the second resonate peak 1702, a third resonate peak 1703 may be formed in the frequency response curves.

Figure 18:
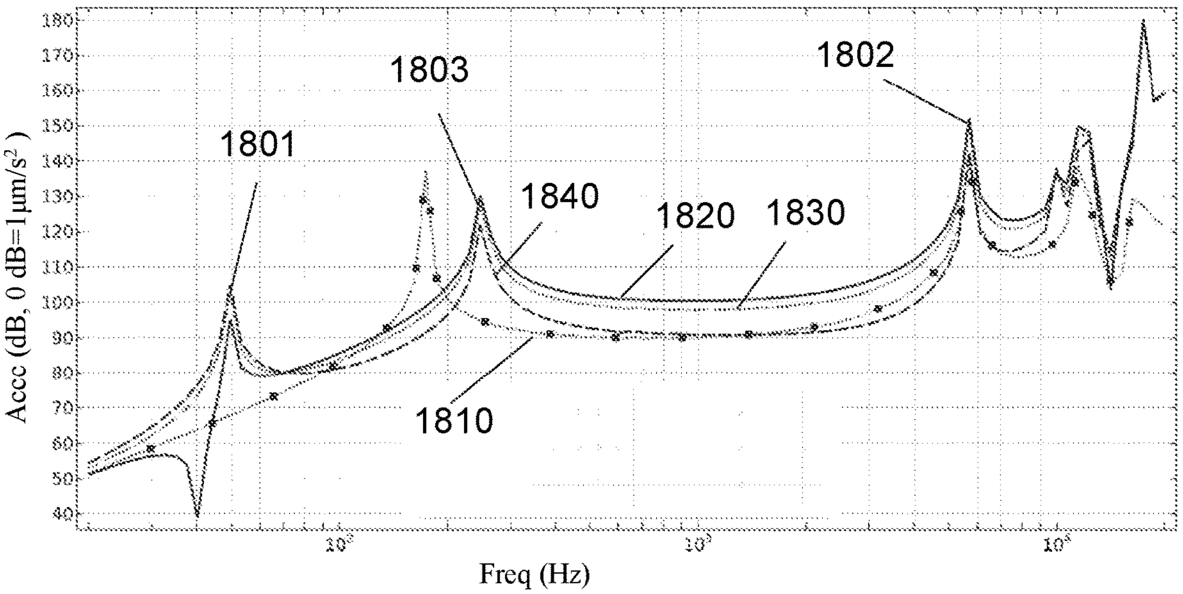
FIG. 18 is a graph illustrating frequency response curves of an acoustic output device according to some embodiments of the present disclosure.

FIG. 18 is a graph illustrating a frequency response curves of an acoustic output device according to some embodiments of the present disclosure. The frequency response curves except a curve 1810 in FIG. 18 may be the frequency response curves of the acoustic output device whose second piezoelectric element (e.g., the second piezoelectric element 1612) has a fixed end along an axis direction. The curve 1810 denotes the frequency response curve of the acoustic output device (e.g., the acoustic output device 900) with the first piezoelectric element, and curves 1820, 1830, and 1840 denote the frequency response curves of the acoustic output device (e.g., the acoustic output device 1600) with the first piezoelectric element and a second piezoelectric element, and an electrical signal received by the first piezoelectric element and the second piezoelectric element have different phase differences. According to the curve 1810 and the curves 1820-1840, when the acoustic output device is disposed with the first piezoelectric element and the second piezoelectric element, except the first resonate peak 1801 and the second resonance peak 1802, a third resonate peak 1803 may be formed in the frequency response curves.

Figure 19:
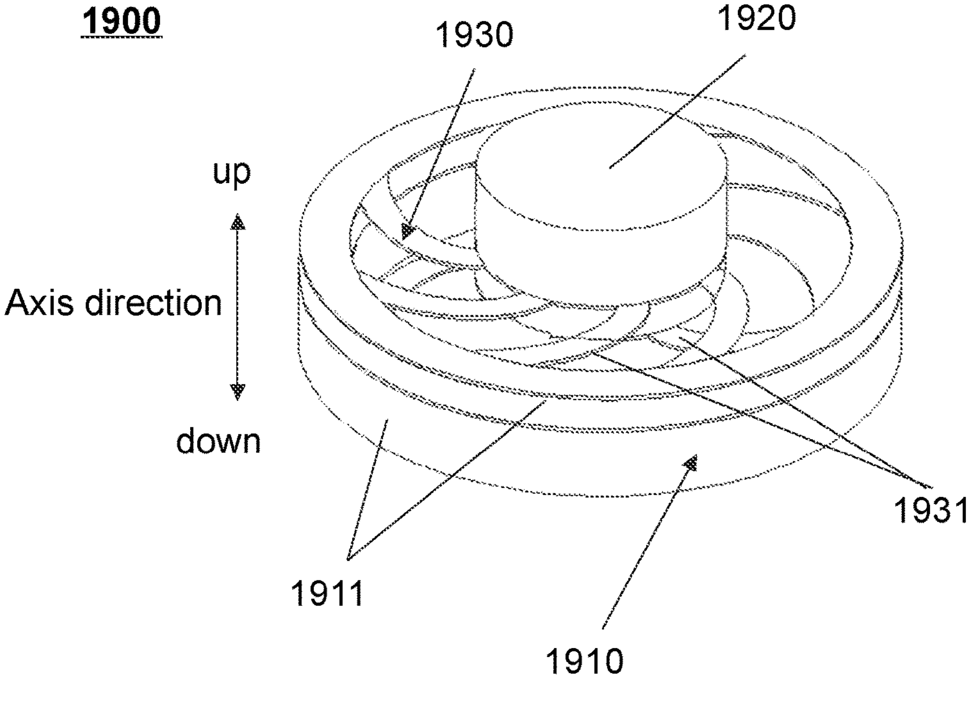
FIG. 19 is a structural diagram illustrating an exemplary acoustic output device according to some embodiments of the present disclosure.

FIG. 19 is a structural diagram illustrating an exemplary acoustic output device according to some embodiments of the present disclosure. Referring to FIG. 19, the acoustic output device 1900 may include one or more piezoelectric elements 1910, a mass element 1920, and one or more elastic elements 1930. In some embodiments, the one or more piezoelectric elements 1910 may include two first piezoelectric elements 1911. The two first piezoelectric elements 1911 may be distributed up and down along an axis direction and connected to each other. The two first piezoelectric elements 1911 are distributed up and down along the axis direction may form a double-layer single-annular structure of the piezoelectric element 1910.

In some embodiments, the mass element 1920 may be respectively connected to the two first piezoelectric elements 1911 through one or more elastic elements 1930. In some embodiments, the one or more elastic elements 1930 may include two layers. The double-layer elastic element 1930 may include two layers of first elastic elements 1931. The two layers of first elastic elements 1931 may be disposed up and down along the axis direction of the piezoelectric element 1910. In some embodiments, the two layers of first elastic elements 1931 may be connected to circumferential directions of the two first piezoelectric elements 1911, respectively. The mass element 1920 may be respectively connected to the two piezoelectric elements 1911 through the two layers of first elastic elements 1931. In some embodiments, the two layers of first elastic elements 1931 may provide shear stresses of opposite curls to the mass element 1920. In some embodiments, the two layers of first elastic elements 1931 may respectively include a plurality of bar structures. Bending directions of the plurality of bar structures of a first layer and bending directions of the plurality of bar structures of a second layer may be opposite to each other, such that a first curl of the shear stress provided by the elastic element of the first layer to the mass element 1920 may be opposite to a second curl of the shear stress provided by the elastic element of the second layer to the mass element 1920. In such cases, the shear stress provided by the two layers of first elastic elements 1931 to the mass element 1920 may be zero or close to zero, thereby preventing or reducing a rotation of the mass element 1920. In some embodiments, the two layers of first elastic elements 1931 may include a first helical structure and a second helical structure. The first helical structure and the second helical structure may have a same axis and opposite helical directions such that the first helical structure and the second helical structure may provide shear stresses with opposite curls to the mass element 1920.

In some embodiments, when a count of the first piezoelectric elements 1911 is two, displacements of the two first piezoelectric elements 1911 along an axis direction during a vibration may be opposite. That is, the displacement of one of the two first piezoelectric elements 1911 along the axis direction during the vibration may get greater (that is, extended), and the displacement of the other of the two first piezoelectric elements 1911 along the axis direction during the vibration may get smaller (i.e., shrunk). In some embodiments, the displacements of the first piezoelectric elements 1911 along the axis direction during the vibration may be adjusted based on a polarization direction of the first piezoelectric element 1911 and an electrode polarity of an electrical signal, more description may be found in FIG. 20A, FIG. 20B, and relevant descriptions thereof in the present disclosure.

In some embodiments, the count of the first piezoelectric elements 1911 of the piezoelectric element 1910 may be multiple, for example, 4, 6, 8, etc. The plurality of first piezoelectric elements 1911 may be connected in sequence along the axis direction. And the mass element 1920 may be connected to each of the plurality of first piezoelectric elements 1911 through the plurality of elastic elements 1930 (e.g., divided into multi-layers), respectively. The elastic elements of adjacent layers in the multi-layers of elastic elements may provide shear stresses with opposite curls to the mass element 1920. In some embodiments, there may be a plurality of mass elements 1920. Each of the plurality of mass elements 1920 may be connected to one first piezoelectric element 1911 through the plurality of elastic elements 1930.

Figure 20A:
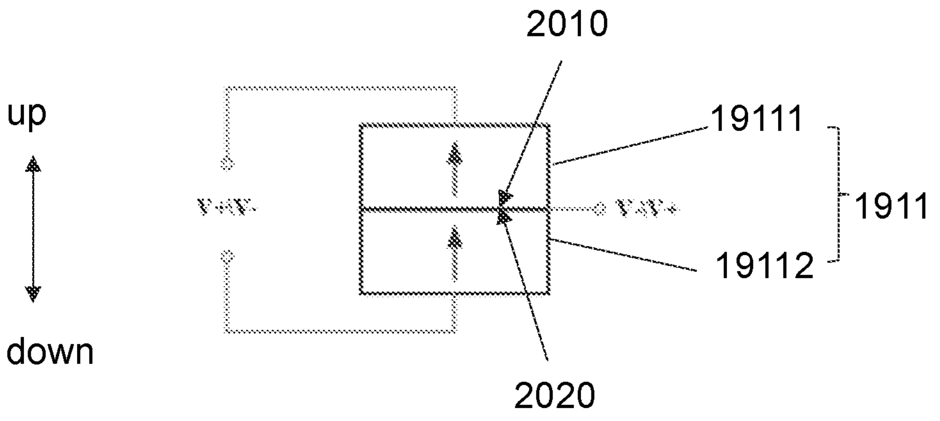
FIG. 20A is a circuit diagram illustrating an exemplary first piezoelectric element according to some embodiments of the present disclosure.

FIG. 20A is a circuit diagram illustrating an exemplary first piezoelectric element according to some embodiments of the present disclosure. Referring to FIG. 20A, polarities of connection faces of the two first piezoelectric elements 1911 may be the same, and electrode polarities of an electrical signal on the connection faces may be the same. To facilitate description, the two first piezoelectric elements 1911 may be respectively referred to as an upper piezoelectric element 19111 and a lower piezoelectric element 19112. In some embodiments, when the upper piezoelectric element 19111 is connected to the lower piezoelectric element 19112, the upper piezoelectric element 19111 may have an upper connection face 2010, and the lower piezoelectric element 19112 may have a lower connection face 2020. In some embodiments, when the polarization direction of the upper piezoelectric element 19111 is the same as the polarization direction of the lower piezoelectric element 19112 (as shown by the arrow in FIG. 20A), the electrode polarity of the electrical signal accessed to the upper connection face 2010 (e.g., positive or negative) may be the same as the electrode polarity of the electrical signal accessed to the lower connection face 2020. In such cases, a potential direction inside the upper piezoelectric element 19111 and a potential direction inside the lower piezoelectric element 19112 may be opposite.

The polarization direction of the upper piezoelectric element 19111 may be the same as the polarization direction of the lower piezoelectric element 19112 such that when the upper piezoelectric element 19111 and the lower piezoelectric element 19112 are accessed to potentials (or electrical signals) in opposite directions, the upper piezoelectric element 19111 and the lower piezoelectric element 19112 may generate displacements in opposite directions.

Figure 20B:
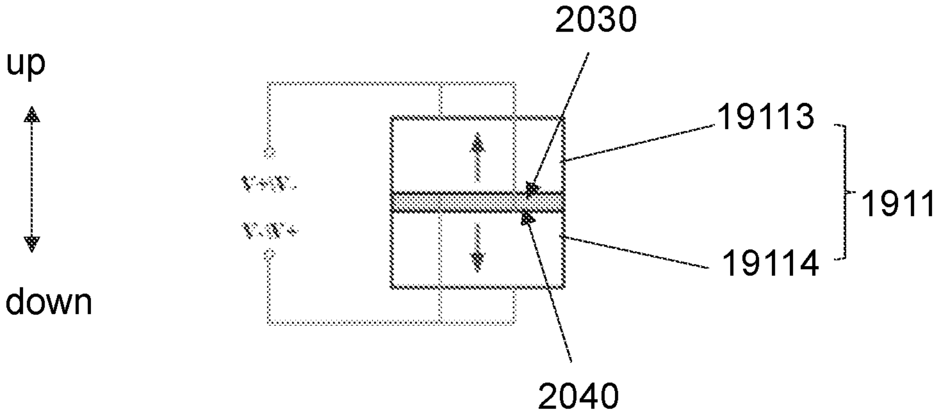
FIG. 20B is a circuit diagram illustrating another exemplary first piezoelectric element according to some embodiments of the present disclosure.

FIG. 20B is a circuit diagram illustrating another exemplary first piezoelectric element according to some embodiments of the present disclosure. Referring to FIG. 20B, the polarities of the connection faces of the two first piezoelectric elements may be opposite, and the electrode polarities of the electrical signals on the connection faces may be opposite. In some embodiments, when the upper piezoelectric element 19113 is connected to the lower piezoelectric element 19114, the upper piezoelectric element 19113 may have an upper connection face 2030, and the lower piezoelectric element 19114 may have a lower connection face 2040. When the polarization direction of the upper piezoelectric element 19112 is opposite to the polarization direction of the lower piezoelectric element 19114 (as shown by the arrow in FIG. 20B), the electrode polarity of the electrical signal accessed to the upper connection face 2030 (e.g., positive or negative) may be opposite to the electrode polarity of the electrical signal accessed to the lower connection face 2040. In such cases, the potential direction inside the upper piezoelectric element 19111 and the potential direction inside the lower piezoelectric element 19112 may be the same.

The polarization directions of the upper piezoelectric element 19113 and the lower piezoelectric element 19114 may be opposite such that when the upper piezoelectric element 19113 and the lower piezoelectric element 19114 are accessed to potentials (or electrical signals) in the same direction, the upper piezoelectric element 19113 and the lower piezoelectric element 19114 may generate displacements in opposite directions.

Figure 21:
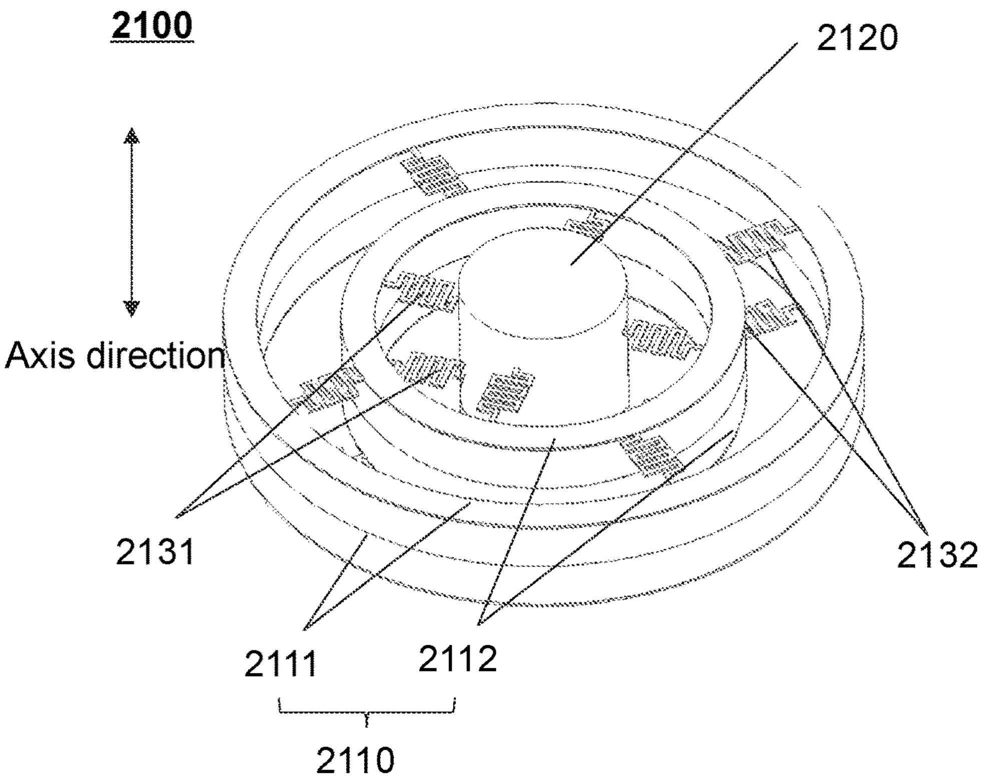
FIG. 21 is a structural diagram illustrating an exemplary acoustic output device according to some embodiments of the present disclosure.

FIG. 21 is a structural diagram illustrating an exemplary acoustic output device according to some embodiments of the present disclosure. The acoustic output device 2100 shown in FIG. 21 may be similar to the acoustic output device 1200 shown in FIG. 12, except for different structures of the piezoelectric elements. The piezoelectric element 1210 of the acoustic output device 1200 may be a single-layer double-annular structure, and the piezoelectric element 2110 of the acoustic output device 2100 may be a double-layer double-annular structure.

Referring to FIG. 21, in some embodiments, one or more piezoelectric elements 2110 may include two first piezoelectric elements 2111 and two second piezoelectric elements 2112. The two first piezoelectric elements 2111 may be distributed up and down along the axis direction and connected to each other. The two second piezoelectric elements 2112 may be located inside the first annular structure and distributed up and down along the axis direction and connected to each other. The axes of the two second piezoelectric elements 2112 and the axes of the two first piezoelectric elements 2111 may coincide. Projections of the two second piezoelectric elements 2112 along the axis direction may be located inside the projections of the first annular structure of the two first piezoelectric elements 2111 along the axis direction.

In some embodiments, the two second piezoelectric elements 2112 may be connected to the two first piezoelectric elements 2111 through at least one of the one or more elastic elements. In some embodiments, the elastic element may include an outer ring elastic element 2132 located between the first annular structure and the second annular structure. The outer ring elastic element 2132 may include two elastic elements. The two first piezoelectric elements 2111 may be connected to the two second piezoelectric elements 2112 through the two elastic elements of the outer ring elastic element 2132. In some embodiments, the outer ring elastic element 2132 may have a certain thickness along the axis direction of the second annular structure, and the two first piezoelectric elements 2111 may be connected to the two second piezoelectric elements 2112 through one outer ring elastic element 2132.

In some embodiments, referring to FIG. 21, at least a portion of the mass element 2120 may be located inside the second annular structure of the second piezoelectric element 2112 (as shown in FIG. 21). The mass element 2120 may be respectively connected to the two second piezoelectric elements 2112 through at least one of the one or more elastic elements 2130. For example, the elastic element 2130 may include an inner ring elastic element 2131 located between the second annular structure and the at least a portion of the mass element 2120. A projection of a connection point between the mass element 2120 and the inner annular elastic element 2131 along the axis direction may be located within a projection of the second annular structure along the axis direction. The inner ring elastic element 2131 may include two elastic elements disposed along the axis direction. The mass element 2120 may be respectively connected to the two second piezoelectric elements 2112 through the two elastic elements of the inner ring elastic element 2131. In some embodiments, the inner ring elastic element 2131 may have a certain thickness along the axis direction of the first annular structure, and the mass element 2120 may be connected to the two second piezoelectric elements 2112 through one inner ring elastic element 2131.

In some embodiments, the shapes of the inner ring elastic element 2131 and the outer ring elastic element 2132 are not limited to the S-shape shown in FIG. 21, and may include other shapes such as a broken line, a spline, an arc, and a straight line. In some embodiments, the inner ring elastic element 2131 and the outer ring elastic element 2132 may include helical structures. In some embodiments, the arrangement between the curl of the shear stress provided by the inner ring elastic element 2131 to the mass element 2120 and the curl of the shear stress provided by the outer ring elastic element 2132 to the mass element 2120, as well as the arrangement of the curls of the shear stresses provided by the two elastic elements of the inner ring elastic element 2131 and/or the outer ring elastic element 2132 to the mass element 2120 may be found elsewhere in the present disclosure, which is not repeated here.

In some embodiments, when at least a portion of the mass element 2120 is located inside the second piezoelectric element 2112, one end of the first piezoelectric element 2111 along the axis direction may be fixed, and the other end may be connected to the second piezoelectric element 2132 through the outer ring elastic element 2132. For example, the outer ring elastic element 2132 may include two elastic elements disposed along the axis direction. The two first piezoelectric elements 2111 may be respectively connected to the two second piezoelectric elements 2112 through the two elastic elements of the outer ring elastic element 2132. In such cases, the second piezoelectric element 2112 may be configured as a piezoelectric free ring, and the first piezoelectric element 2111 may be configured as a piezoelectric fixed ring.

In some embodiments, at least a portion of the mass element 2120 may be located outside the first annular structure of the first piezoelectric element 2111. For example, at least a portion of the mass element 2120 may include an annular structure. A projection of the annular structure of the mass element 2120 along the axis direction may be located outside a projection of the first annular structure along the axis direction. The mass element 2120 may be respectively connected to the two first piezoelectric elements 2111 through at least one of the one or more elastic elements 2130. For example, the mass element 2120 may be respectively connected to the two first piezoelectric elements 2111 through two elastic elements of the outer ring elastic element 2132.

In some embodiments, when the mass element 2120 is located outside the first piezoelectric element 2111, one end of the second piezoelectric element 2112 along the axis direction may be fixed, and the other end may be connected to the first piezoelectric element 2111 through the inner ring elastic element 2131. In such cases, the second piezoelectric element 2112 may be configured as the piezoelectric fixed ring, and the first piezoelectric element 2111 may be configured as the piezoelectric free ring.

In some embodiments, at least a portion of the mass element 2120 may be located between the first annular structure of the first piezoelectric element 2111 and the second annular structure of the second piezoelectric element 2112. The projection of the annular structure of the mass element 2120 along the axis direction may be located between the projections of the first annular structure and the second annular structure along the axis direction. The mass element 2120 may be connected to the two first piezoelectric elements 2111 and the two second piezoelectric elements 2112 through one or more elastic elements 2130. For example, the mass element 2120 may be respectively connected to the two first piezoelectric elements 2111 through the outer ring elastic element 2132, and the mass element 2120 may be respectively connected to the two second piezoelectric elements 2112 through the inner ring elastic element 2131.

In some embodiments, when the mass element 2120 is located between the second piezoelectric element 2112 and the first piezoelectric element 2111, the first piezoelectric element 2111 or the second piezoelectric element 2112 may have a fixed end along the axis direction. In such cases, one of the first piezoelectric element 2111 and the second piezoelectric element 2112 may be configured as the piezoelectric free ring, and the other may be configured as the piezoelectric fixed ring.

It should be noted that when the piezoelectric element 2110 is a double-layer structure, the elastic element may also be a double-layer structure, and the curls of the shear stresses provided by the two layers of elastic elements may be opposite. In some embodiments, the piezoelectric element may be a multi-layer multi-annular structure, for example, a 4-layer, 4-annular structure, etc. The piezoelectric element of the multi-layer multi-annular structure may be similar to the piezoelectric element of the double-layer double-annular structure, which is not repeated here.

Figure 22:
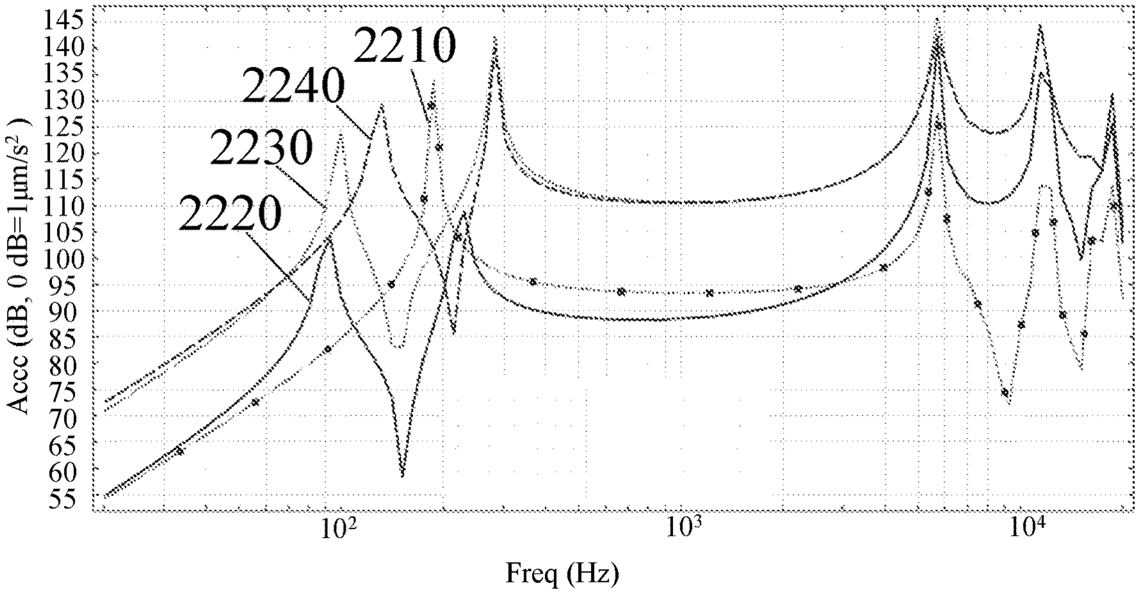
FIG. 22 is a graph illustrating frequency response curves of an acoustic output device according to some embodiments of the present disclosure.

FIG. 22 is a graph illustrating frequency response curves of an acoustic output device according to some embodiments of the present disclosure. A curve 2210 denotes the frequency response curve of the acoustic output device when a piezoelectric element is a single-layer single-annular structure, and a curve 2220 denotes the frequency response curve of the acoustic output device when the piezoelectric element is a single-layer double-annular structure and the first piezoelectric element has a fixed end along the axis direction. In some embodiments, a piezoelectric free ring may be disposed in the acoustic output device such that a third resonance peak except a first resonance peak and a second resonance peak may be formed in the frequency response curve of the acoustic output device. For example, according to curve 2210 and curve 2220, curve 2220 may include a third resonance peak except the first resonance peak and the second resonance peak, and the frequency of the third resonance peak is between the frequency of the first resonance peak and the frequency of the second resonance peak.

According to FIG. 22, a curve 2230 denotes a frequency response curve of the acoustic output device when the piezoelectric element is a double-layer double-annular structure and the first piezoelectric element has a fixed end along the axis direction. A curve 2240 denotes a frequency response curve of the acoustic output device when the piezoelectric element is the double-layer double-annular structure and the piezoelectric element does not have a fixed end along the axis direction. In some embodiments, a sensitivity of the acoustic output device including a piezoelectric element with a double-layer opposite vibration structure in an audible domain may be improved. For example, according to curve 2220 and curve 2230, curve 2230 is generally shifted upwards relative to curve 2220, and the sensitivity of curve 2230 may be higher than that of curve 2220. In some embodiments, the first piezoelectric element and the second piezoelectric element may be configured in a free ring state, and the first piezoelectric element and the second piezoelectric element (and the elastic element for connection) may form an integral mass with the mass element. In such cases, the low-frequency resonance peak of the acoustic output device may move to the right. For example, according to curve 2230 and curve 2240, the first resonance peak of the curve 2240 moves to the right relative to the first resonance peak of the curve 2230, and an amplitude of the first resonance peak and the amplitude of the frequency band before the first resonance peak of the curve 2240 improves, which may improve a low-frequency performance.

In some embodiments, when the piezoelectric element is a double-layer structure, the structures of the two layers of piezoelectric elements may be the same. For example, the piezoelectric element may include two first piezoelectric elements disposed in sequence along the axis direction, and the structures of the two piezoelectric elements may be both annular structures. In some embodiments, when the piezoelectric element is the double-layer structure, the structures of the two layers of piezoelectric elements may be different. For example, any one of the two layers of the piezoelectric elements may be the annular structure, and the other layer of the piezoelectric elements may be a piezoelectric beam structure.

Figure 23:
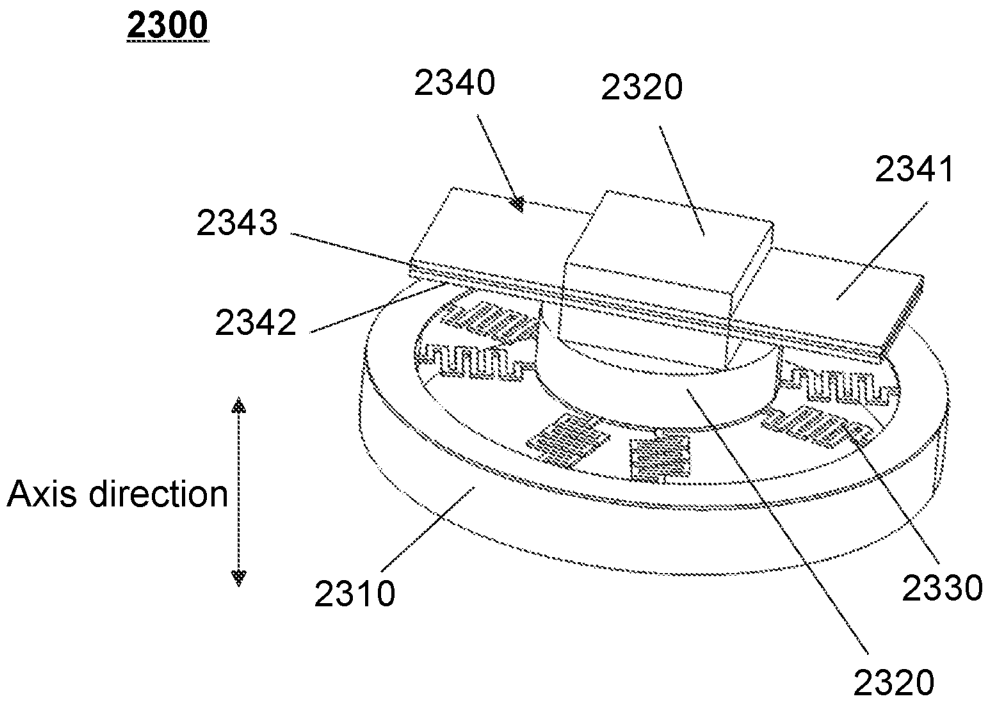
FIG. 23 is a structural diagram illustrating an exemplary acoustic output device according to some embodiments of the present disclosure.

FIG. 23 is a structural diagram illustrating an exemplary acoustic output device according to some embodiments of the present disclosure. As shown in FIG. 23, an acoustic output device 2300 may include one or more piezoelectric elements 2310, a mass element 2320, and one or more elastic elements 2330. In some embodiments, the one or more piezoelectric elements 2310 may include a piezoelectric beam (or a beam structure) 2340. The piezoelectric beam 2340 may include a substrate 2343 and a piezoelectric sheet (e.g., a piezoelectric sheet 2341 and a piezoelectric sheet 2342). In some embodiments, the piezoelectric beam 2340 may be connected to the mass element 2320. In some embodiments, the piezoelectric beam 2340 may be located on a side of the mass element 2320 away from the piezoelectric element 2310 along the axis direction of an annular structure of the piezoelectric element 2310 and connected to the mass element 2320. In some embodiments, the piezoelectric beam 2340 may be a plate structure. A plate surface (i.e., the surface with the greatest area) of the plate structure may be parallel to an annular end face of the annular structure of the piezoelectric element 2310.

In some embodiments, the piezoelectric sheet may include at least one first piezoelectric sheet 2341 and at least one second piezoelectric sheet 2342. The first piezoelectric sheet 2341 and the second piezoelectric sheet 2342 may be respectively disposed on two sides of the piezoelectric beam 2340 along the axis direction of the annular structure of the piezoelectric element 2310. For example, the first piezoelectric sheet 2341 may be disposed on the side of the piezoelectric beam 2340 away from the piezoelectric element 2310 along the axis direction, and the second piezoelectric sheet 2342 may be disposed on the side of the piezoelectric beam 2340 close to the piezoelectric element 2310 along the axis direction.

In some embodiments, the first piezoelectric sheet 2341 and/or the second piezoelectric sheet 2342 may be used to generate a deformation based on an electrical signal. A direction of the deformation (also referred to as a displacement output direction) may be perpendicular to an electrical direction of the first piezoelectric sheet 2341 and/or the second piezoelectric sheet 2342. In some embodiments, the electrical direction of the first piezoelectric sheet 2341 (and/or the second piezoelectric sheet 2342) may be parallel to the electrical direction of the first piezoelectric sheet 2341 (and/or the second piezoelectric sheet 2342). In some embodiments, the substrate 2343 may warp along the electrical direction of the piezoelectric sheet based on the deformation of the piezoelectric sheet to generate a mechanical vibration. The direction of the mechanical vibration may be parallel to the electrical direction of the first piezoelectric sheet 2341 (and/or the second piezoelectric sheet 2342).

In some embodiments, the electrical directions of the first piezoelectric sheet 2341 and the second piezoelectric sheet 2342 may be opposite to each other along the axis direction of the annular structure. That is, in the axis direction of the annular structure of the piezoelectric element 2310, the electrical direction of the first piezoelectric piece 2341 may be opposite to the electrical direction of the second piezoelectric piece 2342. The displacement output directions of the first piezoelectric sheet 2341 and the second piezoelectric sheet 2342 may be perpendicular to their respective electrical directions. In some embodiments, when the electrical direction of the first piezoelectric sheet 2341 is opposite to the electrical direction of the second piezoelectric sheet 2342, and the first piezoelectric sheet 2341 and the second piezoelectric sheet 2342 receive voltage signals in the same direction at the same time, the first piezoelectric sheet 2341 and the second piezoelectric sheet 2342 may generate displacements in opposite directions such that the piezoelectric beam 2340 may vibrate. The vibration direction of the piezoelectric beam 2340 may be perpendicular to the displacement output direction of the first piezoelectric sheet 2341 and the second piezoelectric sheet 2342. For example, the first piezoelectric sheet 2341 may contract along the direction perpendicular to the axis direction of the annular structure, and the second piezoelectric sheet 2342 may extend along the direction perpendicular to the axis direction of the annular structure, such that the piezoelectric beam 2340 may generate vibration. In some embodiments, the piezoelectric beam 2340 may be connected to the mass element 2320 and output vibration through the mass element 2320. In some embodiments, the piezoelectric beam 2340 may be directly connected to the mass element 2320 such that the resonance peak of the acoustic output device 2300 may include a high-frequency resonance peak (e.g., in a range of 2 kHz-20 kHz) generated by a resonance of the piezoelectric beam 2340, that is, the piezoelectric beam 2340 constitutes a high-frequency unit of the acoustic output device 2300.

In some embodiments, the piezoelectric element 210 in annular structure may include a piezoelectric sheet. The piezoelectric sheet may be in the shape of a block (e.g., in a shape of an annular block). The piezoelectric sheet may generate the mechanical vibration based on the electrical signal, and the direction of the mechanical vibration of the piezoelectric sheet may be parallel to the electrical direction of the piezoelectric sheet. In some embodiments, when the piezoelectric sheet receives the voltage signal along the axis direction of the annular structure, the piezoelectric sheet may vibrate along the axis of the annular structure, thereby generating a displacement output along the axis direction of the annular structure.

In some embodiments, the structure of the elastic element 2330 in the acoustic output device 2300 may be a double X-shape structure as shown in FIG. 23, or may be other opposite symmetry structures, such as a single X-shape, a parallel double X-shape, a helical structure, etc.

Figure 24:
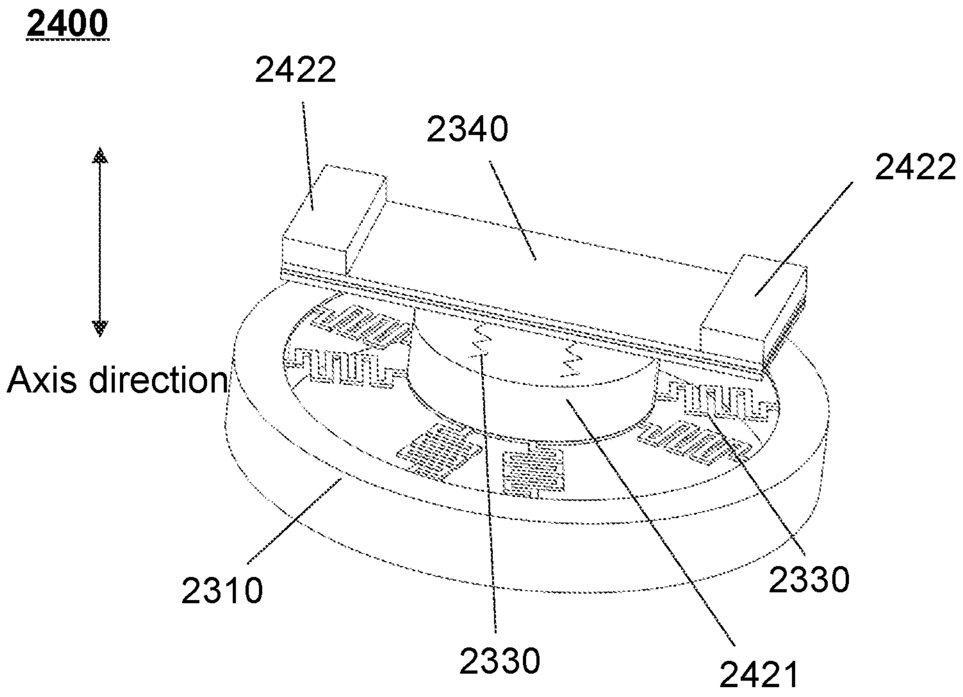
FIG. 24 is a structural diagram illustrating an exemplary acoustic output device according to some embodiments of the present disclosure.

FIG. 24 is a structural diagram illustrating an exemplary acoustic output device according to some embodiments of the present disclosure. The acoustic output device 2400 in FIG. 24 may be substantially the same as the acoustic output device 2300 in FIG. 23, the difference lies in structures and counts of mass elements, and connection manners between the mass elements and the piezoelectric beams.

Referring to FIG. 24, in some embodiments, the mass elements may include a first mass element 2421, and a second mass element 2422. The first mass element 2421 may be connected to a middle part of a piezoelectric beam 2340 through one or more elastic elements 2330. In some embodiments, the first mass element 2421 may be connected to one or more piezoelectric elements 2310 through the elastic element 2330. The piezoelectric element 2310 may include an annular structure, and a vibration direction of the piezoelectric element 2310 may be parallel to an axis direction of the annular structure. In some embodiments, two ends of the piezoelectric beam 2340 may be respectively connected to the second mass elements 2422. A vibration of the acoustic output device 2400 may be output through the second mass element 2422 at the end of the piezoelectric beam 2340. In some embodiments, the vibration of the acoustic output device 2400 may be output through the first mass element 2421. In some embodiments, a portion of the first mass element 2421 of the acoustic output device 2400 connected to the piezoelectric beam 2340 through one or more elastic elements 2330 may constitute a low-frequency unit of the acoustic output device 2400, and the piezoelectric element 2310 with the annular structure may constitute a high-frequency unit of the acoustic output device 2400.

In some embodiments, the first mass element 2421 may be connected to other positions of the piezoelectric beam 2340 (e.g., the position near the ends of the piezoelectric beam 2340) through the one or more elastic elements 2330. In some embodiments, the two ends of the piezoelectric beam 2340 may be connected to the second mass element 2422 through one or more elastic elements 2330.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined.

In addition, those skilled in the art will understand that various aspects of the present disclosure may be illustrated and described in several patentable categories or circumstances, including any new and useful process, machine, products, substances, or the combination thereof, or any new and useful improvements thereof. Accordingly, all aspects of the present disclosure may be performed entirely by hardware, may be performed entirely by software (including firmware, resident software, microcode, etc.), or may be performed by a combination of hardware and software. The above hardware or software may be referred to as "block", "module", "engine", "unit", "component" or "system". Additionally, aspects of the present disclosure may be embodied as a computer product including computer readable program code on one or more computer readable media.

A computer storage medium may contain a propagated data signal with the computer program code, for example, on baseband or as part of a carrier wave. The propagated signal may have various manifestations, including an electromagnetic form, an optical form, etc., or a suitable combination. The computer storage media can be any computer-readable media other than computer-readable storage media that can communicate, propagate, or transmit a program for use by coupling to an instruction execution system, apparatus, or device. A program code residing on a computer storage medium may be transmitted over any suitable medium, including a radio, an electrical cable, a fiber optic cable, an RF, etc., or any combinations thereof.

The computer program code required for the operation of the various parts of this application may be written in any one or more programming languages, including object-oriented programming languages such as Java, Scala, Smalltalk, Eiffel, JADE, Emerald, C++, C #, VB.NET, Python etc., conventional procedural programming languages such as C language, Visual Basic, Fortran 2003, Perl, COBOL 2002, PHP, ABAP, dynamic programming languages such as Python, Ruby and Groovy, or other programming languages, etc. The program code may run entirely on the user's computer, or as a stand-alone software package on the user's computer, or partly on the user's computer and partly on a remote computer, or entirely on the remote computer or server. In the latter case, the remote computer may be connected to the user's computer through any network, such as a local area network (LAN) or wide area network (WAN), or to an external computer (e.g., through the Internet), or in a cloud computing environment, or used as a service, such as a Software as a service (SaaS).

Furthermore, unless explicitly stated in the claims, the order of processing elements and sequences described in the present disclosure, the use of numbers and letters, or the use of other names are not intended to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, rather, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless otherwise stated, the "about", "approximately" or "substantially" indicates that the stated figure allows for a variation of ±20%. Accordingly, in some embodiments, the numerical parameters used in the present disclosure and claims are approximations that can vary depending upon the desired characteristics of individual embodiments. In some embodiments, the numerical parameters should take into account the specified significant digits and adopt the general digit reservation method. Although the numerical ranges and parameters used in some embodiments of the present disclosure to confirm the breadth of the scope are approximate values, in specific embodiments, such numerical values are set as precisely as practicable.

The entire contents of each patent, patent application, patent application publication, and other material, such as article, book, specification, publication, document, etc., cited in this the present disclosure are hereby incorporated by reference into this the present disclosure. Application history documents that are inconsistent or conflicting with the contents of the present disclosure are excluded, and documents (currently or later attached to the present disclosure) that limit the widest range of the scope of the present disclosure are also excluded. It should be noted that if there is any inconsistency or conflict between the descriptions, definitions, and/or terms used in the attached materials of this the present disclosure and the contents of this the present disclosure, the descriptions, definitions and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An acoustic output device, comprising:

a piezoelectric element configured to convert an electrical signal into a mechanical vibration;

an elastic element; and a mass element connected to the piezoelectric element through the elastic element, the mass element being configured to receive the mechanical vibration and generate an acoustic signal, wherein on a plane perpendicular to a vibration direction of the mass element, the elastic element provides shear stresses with opposite curls;

a resonance of the elastic element and the mass element generates a first resonance peak, and a resonance of the piezoelectric element generates a second resonance peak; and a frequency range of the first resonance peak is in a range of 50 Hz-2000 Hz.

2. The acoustic output device of claim 1, wherein the elastic element includes a plurality of bar structures, and each bar structure includes one or more bending regions, the shear stress provided by each bending region corresponding to a curl.

3. The acoustic output device of claim 2, wherein the plurality of bar structures are located in a same plane perpendicular to the vibration direction of the mass element.

4. The acoustic output device of claim 3, wherein a projection of the elastic element along the vibration direction of the mass element has two symmetry axes perpendicular to each other.

5. The acoustic output device of claim 3, wherein at least one of the plurality of bar structures includes a plurality of segments, and the segments provide shear stresses with opposite curls.

6. The acoustic output device of claim 3, further comprising a second elastic element, and the elastic element and the second elastic element are connected to the mass element, respectively.

7. The acoustic output device of claim 6, wherein the second elastic element and the elastic element are located on a same plane, the plane is perpendicular to the vibration direction of the mass element, and a central axis of the second elastic element is parallel to a central axis of the elastic element.

8. The acoustic output device of claim 6, wherein the second elastic element is coaxial with the elastic element.

9. The acoustic output device of claim 1, wherein the elastic element includes a first helical structure and a second helical structure, each of the first helical structure and the second helical structure is connected to the mass element and the piezoelectric element, and the first helical structure and the second helical structure have a same axis and opposite helical directions.

10. The acoustic output device of claim 9, wherein centers of the first helical structure and the second helical structure are rigidly connected to each other, the centers are connected to the mass element, and outer edges of the first helical structure and the second helical structure are rigidly connected to each other, and the outer edges are connected to the piezoelectric element.

11. The acoustic output device of claim 1, wherein the piezoelectric element includes an annular structure, an axis direction of the annular structure is parallel to the vibration direction of the mass element, the annular structure includes a first annular structure and a second annular structure, and the second annular structure is disposed inside the first annular structure.

12. The acoustic output device of claim 11, wherein one end of the first annular structure along the axis direction is fixed, and the other end of the first annular structure is connected to the second annular structure through an outer ring elastic element of the elastic element; and the mass element is connected to the second annular structure through an inner ring elastic element of the elastic element, and a projection of a connection point between the mass element and the inner ring elastic element along the axis direction is located within a projection of the second annular structure along the axis direction.

13. The acoustic output device of claim 11, wherein one end of the second annular structure along the axis direction is fixed, and the other end of the second annular structure is connected to the first elastic element through an inner ring elastic element of the elastic element; and at least a portion of the mass element has an annular structure, the annular structure of the mass element is connected to the first annular structure through an outer ring elastic element of the elastic element, and a projection of the annular structure of the mass element along the axis direction is outside a projection of the first annular structure along the axis direction.

14. The acoustic output device of claim 11, wherein at least a portion of the mass element has an annular structure, and a projection of the annular structure of the mass element along the axis direction is located between a projection of the first annular structure and a projection of the second annular structure along the axis direction;

the annular structure of the mass element is connected to the second annular structure through an inner ring elastic element of the elastic element, and the annular structure of the mass element is connected to the first annular structure through an outer ring elastic element of the elastic element; and the first annular structure or the second annular structure has a fixed end along the axis direction.

15. The acoustic output device of claim 12, wherein the inner ring elastic element and the outer ring elastic element provide shear stresses with opposite curls.

16. The acoustic output device of claim 1, wherein a frequency range of the second resonance peak is in a range of 1000 Hz-50000 Hz.

17. An acoustic output device, comprising:

a piezoelectric element configured to convert an electrical signal into a mechanical vibration;

an elastic element including a plurality of bar structures, each bar structure including one or more bending regions; and a mass element connected to the piezoelectric element through the elastic element, the mass element being configured to receive the mechanical vibration and generate an acoustic signal, wherein the plurality of bar structures are located in a same plane perpendicular to a vibration direction of the mass element, and a projection of the plurality of bar structures along the vibration direction of the mass element has two symmetry axes perpendicular to each other;

a resonance of the elastic element and the mass element generates a first resonance peak, and a resonance of the piezoelectric element generates a second resonance peak; and a frequency range of the first resonance peak is in a range of 50 Hz-2000 Hz.

18. An acoustic output device, comprising:

a piezoelectric element configured to convert an electrical signal into a mechanical vibration;

an elastic element; and a mass element connected to the piezoelectric element through the elastic element, the mass element being configured to receive the mechanical vibration to generate an acoustic signal, wherein the elastic element includes a first helical structure and a second helical structure, and each of the first helical structure and the second helical structure is connected to the mass element and the piezoelectric element; the first helical structure and the second helical structure have a same axis and opposite helical directions.

19. The acoustic output device of claim 1, wherein the piezoelectric element comprises:

a piezoelectric sheet configured to generate the mechanical vibration based on the electrical signal, wherein an electrical direction of the piezoelectric sheet is parallel to a direction of the mechanical vibration.

20. The acoustic output device of claim 1, wherein the piezoelectric element comprises:

a piezoelectric sheet configured to generate a deformation based on the electrical signal, wherein an electrical direction of the piezoelectric sheet is perpendicular to a direction of the deformation; and a substrate configured to generate the mechanical vibration based on the deformation, wherein a direction of the mechanical vibration is parallel to the electrical direction of the piezoelectric sheet.

* * * * *